(12) United States Patent
Goel et al.

(10) Patent No.: US 11,477,120 B2
(45) Date of Patent: Oct. 18, 2022

(54) CONGESTION CONTROL IN AN ON-CHIP NETWORK

(71) Applicant: Fungible, Inc., Santa Clara, CA (US)

(72) Inventors: Deepak Goel, San Jose, CA (US); Rohit Sunkam Ramanujam, Sunnyvale, CA (US); Yogesh Andra, Fremont, CA (US)

(73) Assignee: Fungible, Inc., Santa Clara, CA (US)

( * ) Notice: Subject to any disclaimer, the term of this patent is extended or adjusted under 35 U.S.C. 154(b) by 0 days.

(21) Appl. No.: 16/828,778

(22) Filed: Mar. 24, 2020

(65) Prior Publication Data

US 2020/0314012 A1   Oct. 1, 2020

Related U.S. Application Data

(60) Provisional application No. 62/823,306, filed on Mar. 25, 2019.

(51) Int. Cl.
| | |
|---|---|
| *H04L 12/801* | (2013.01) |
| *H04L 12/835* | (2013.01) |
| *H04L 47/12* | (2022.01) |
| *H04L 47/30* | (2022.01) |
| *H04L 47/32* | (2022.01) |
| *H04W 4/02* | (2018.01) |
| *H04W 4/06* | (2009.01) |
| *H04W 28/02* | (2009.01) |
| *H04W 84/18* | (2009.01) |

(52) U.S. Cl.
CPC .............. *H04L 47/12* (2013.01); *H04L 47/30* (2013.01); *H04L 47/32* (2013.01); *H04W 4/023* (2013.01); *H04W 4/06* (2013.01); *H04W 28/0289* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 10,187,926 B2* | 1/2019 | Kwak | H04W 48/10 |
| 2006/0174023 A1 | 8/2006 | Horn et al. | |
| 2007/0121499 A1* | 5/2007 | Pal | H04L 49/1515 370/230 |
| 2014/0161135 A1* | 6/2014 | Acharya | H04L 47/6255 370/412 |

(Continued)

OTHER PUBLICATIONS

Abderezak et al., "All-to-all broadcasting in torus Network on Chip," Journal of Supercomputing, Kluwer Academic Publishers, vol. 71, No. 7, Mar. 21, 2015, pp. 2585-2596.

(Continued)

*Primary Examiner* — Eunsook Choi
(74) *Attorney, Agent, or Firm* — Shumaker & Sieffert, P.A.

(57) ABSTRACT

The disclosure describes example techniques for determining a data rate at which destination blocks are to receive data unit on a communication mesh. The destination block may determine the data rate at which the destination block is to receive data unit and broadcast information indicative of the data rate on a congestion mesh. The congestion mesh may be configured to route the broadcasted information in a manner that accounts for the relative positions of the circuit blocks in the congestion mesh.

20 Claims, 7 Drawing Sheets

(56) References Cited

U.S. PATENT DOCUMENTS

2017/0223575 A1\* 8/2017 Duda ...................... H04L 43/16
2019/0089645 A1\* 3/2019 Fu ....................... H04L 47/6275

OTHER PUBLICATIONS

International Preliminary Report on Patentability from International Application No. PCT/US2020/024507, dated Oct. 7, 2021, 8 pp.
International Search Report and Written Opinion of International Application No. PCT/US2020/024507, dated Aug. 17, 2020, 15 pp.

\* cited by examiner

CONGESTION CONTROL IN AN ON-CHIP NETWORK

This application claims the benefit of U.S. Provisional Patent Application 62/823,306, filed Mar. 25, 2019, the entire content of which is hereby incorporated by reference.

TECHNICAL FIELD

This disclosure relates to computing devices for processing stream data, for example, in the fields of networking and storage.

BACKGROUND

A so-called network-on-chip includes a plurality of integrated circuit (IC) blocks that are interconnected via a communication fabric such as a mesh, crossbar, ring, etc. to form an on-chip network. One or more source blocks of the IC blocks output stream data units to a destination block of the IC blocks for processing via the communication fabric. If a first destination block is unable to process the data units received from a first set of one or more source blocks within a certain amount of time, there can be congestion on the communication fabric which can delay transmission and reception of data units from a second set of one or more source blocks to a second destination block.

SUMMARY

In general, this disclosure describes an interconnection fabric within a data processing unit (DPU) and a rate management scheme to control a rate at which circuit blocks (e.g., source blocks) output data units to another circuit block (e.g., a destination block) to reduce congestion that would otherwise increase the latency of other destination blocks receiving data units. The interconnection fabric includes a communication mesh and a congestion mesh. The communication mesh includes a plurality of data lines that carry the data units, and the congestion mesh includes a plurality of congestion lines that carry information indicative of the rate at which data is to be transmitted to respective circuit blocks.

As described in more detail, the destination block determines a drain rate of an egress buffer of the destination block, where the drain rate is indicative of a rate at which the destination block is processing the data units. In some examples, based on the drain rate and the occupancy of the egress buffer, the destination block determines the rate at which data units are to be transmitted to the destination block.

As also described in more detail, congestion lines are interconnected via a plurality of broadcast routers of respective circuit blocks. The broadcast routers output on the congestion lines information indicative of a rate at which data is to be transmitted to their respective circuit blocks to each of the other broadcast routers to which the broadcast routers are coupled. In such examples, a broadcast router may receive information from multiple other broadcast routers with which the broadcast router is coupled. However, the broadcast router may further broadcast a subset (e.g., only one) of the information received from the multiple other broadcast routers (e.g., based on a position of the multiple other broadcast routers). In this way, the example broadcast routers, which may form part of the congestion mesh, route information in a manner that accounts for the relative positions of the circuit blocks that include the respective broadcast routers. For instance, in some examples, the relative positions of the circuit blocks in the congestion mesh is based on the relative positions of their corresponding broadcast routers in the congestion mesh.

The techniques of this application provide at least one practical application of at least one technical advantage or improvement. In a DPU, the set of source blocks from which a destination block receives data units can change frequently. Also, the rate at which a destination block is able to process data units can also vary. Accordingly, with the destination block determining the rate at which to receive data units (e.g., determining the rate at which source blocks are to transmit to the destination block), the drain rate of the destination block is accounted for in determining the rate at which data unit are to be transmitted to the destination block. Moreover, with the broadcast scheme of broadcasting the rate which a destination block is to receive data facilitates fair bandwidth allocation to all source blocks, and also facilitates configurations in which any source block that will be transmitting to the destination block transmits at a rate that reduces, and in some cases minimizes, congestion on the data lines.

In one example, this disclosure describes a data processing unit (DPU) integrated circuit comprising a plurality of circuit blocks comprising at least one destination block. The at least one destination block is configured to determine information indicative of a rate at which data units are to be transmitted to the at least one destination block and broadcast to the plurality of circuit blocks the determined information indicative of the rate at which data units are to be transmitted to the at least one destination block. The DPU also includes a communication mesh comprising a plurality of data lines to carry the data units to the at least one destination block and a congestion mesh comprising a plurality of congestion lines to carry the determined information indicative of the rate at which data units are to be transmitted to the at least one destination block. The congestion mesh is configured to route the determined information in a manner that accounts for relative positions of the circuit bocks in the congestion mesh.

In one example, this disclosure describes a method for communicating in a data processing unit (DPU) integrated circuit, the method comprising determining, with at least one destination block of the DPU, information indicative of a rate at which data units are to be transmitted to the at least one destination block of the DPU. The DPU comprises a plurality of circuit blocks and at least one of the plurality of circuit blocks is the at least one destination block. The method also includes broadcasting, with the at least one destination block, to the plurality of circuit blocks the determined information indicative of the rate at which data units are to be transmitted to the at least one destination block, carrying, via a plurality of data lines of a communication mesh, the data unit on to the at least one destination block, and carrying, via a plurality of congestion lines of a congestion mesh, the determined information indicative of the rate at which data units are to be transmitted to the at least one destination block. The congestion mesh is configured to route the determined information in a manner that accounts for relative positions of the circuit bocks in the congestion mesh.

The details of one or more examples are set forth in the accompanying drawings and the description below. Other features, objects, and advantages will be apparent from the description and drawings, and from the claims.

DETAILED DESCRIPTION

FIGS. 1A-1D are block diagrams illustrating example implementations of a computing device including a data processing unit (DPU) configured according to the techniques of this disclosure. As described in more detail below, a DPU is an integrated circuit (IC) chip that contains an on-chip network to connect different circuit components like processing circuitry, input/output (IO) interface circuitry, memory interface circuitry, and the like within the IC chip using a shared communication fabric. For example, each of these circuit components is connected to a respective data router, and the data router is connected to data lines that form a communication mesh. As one example, the DPU includes a communication mesh, arranged in a mesh topology, that interconnects processing circuitry, network units, host units, high bandwidth memory (HBM) interface circuitry, and double data rate (DDR) memory interface circuitry via respective data routers coupled to the data lines of the communication mesh. Non-limiting examples of the mesh topology include multi-dimensional mesh and torus topologies, crossbar topology, and ring topology (1D torus).

Figure 1A:
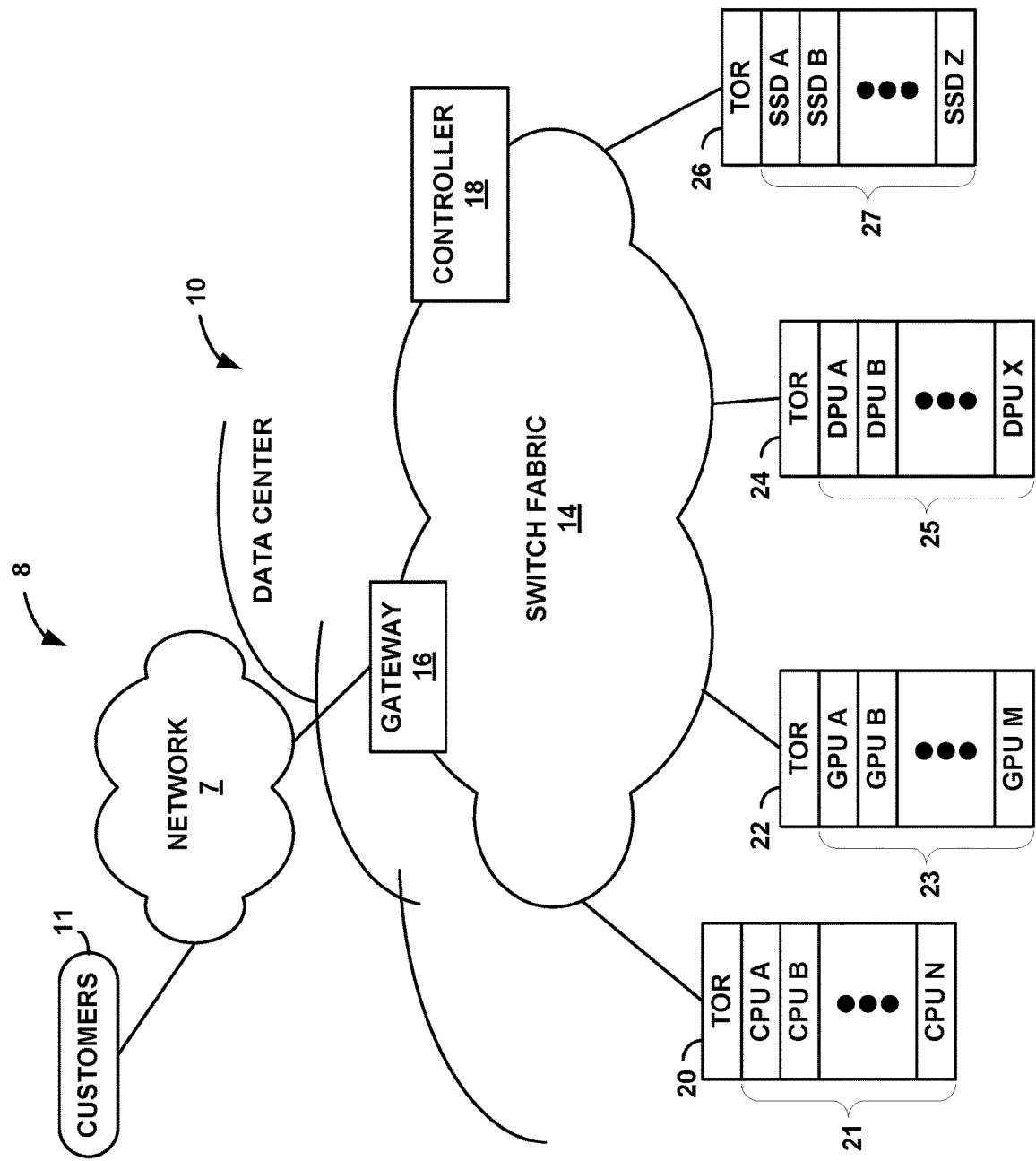
FIGS. 1A-1D are block diagrams illustrating various example implementations of a computing device including a data processing unit configured according to the techniques of this disclosure.

FIG. 1A is a block diagram illustrating an example system 8 having a data center 10 including racks of various devices, such as computing devices, data processing devices, and storage devices, in which one or more of the devices include a data processing unit configured according to the techniques of this disclosure. In general, data center 10 provides an operating environment for applications and services for customers 11 coupled to data center 10 by network 7 and gateway device 16. In some examples, network 7 may be a content/service provider network. In other examples, network 7 may be a data center wide-area network (DC WAN), private network or other type of network. Data center 10 may, for example, host infrastructure equipment, such as compute nodes, networking and storage systems, redundant power supplies, and environmental controls. Network 7 may be coupled to one or more networks administered by other providers and may thus form part of a large-scale public network infrastructure, e.g., the Internet.

In some examples, data center 10 may represent one of many geographically distributed network data centers. In the example of FIG. 1A, data center 10 is a facility that provides information services for customers 11. Customers 11 may be collective entities such as enterprises and governments, or individuals. For example, a network data center may host web services for several enterprises and end users. Other exemplary services may include data storage, virtual private networks, file storage services, data mining services, scientific- or super-computing services, and so on.

This disclosure describes examples of data processing units (DPUs) that may be utilized within one or more computing devices. Unlike conventional compute models that are centered around a central processing unit (CPU), a DPU is used that is specially designed and optimized for a data-centric computing model in which the data processing tasks are centered around, and the primary responsibility of the DPU. The DPU may be viewed as a highly programmable, high-performance input/output (I/O) and data-processing hub designed to aggregate and process network and storage I/O to and from multiple other components and/or devices.

In the illustrated example of FIG. 1A, data center 10 includes a number of racks hosting various types of devices that provide an operational environment for hosting cloud services. In this example, data center 10 includes a central processing unit (CPU) rack 20, a graphics processing unit (GPU) rack 22, a data processing unit (DPU) rack 24, and a solid state drive (SSD) storage device rack 26. Although only one rack of each type is illustrated in FIG. 1A, it is understood that in other examples data center 10 may include a set, i.e., two or more, of each type of rack.

One or more of the devices held in CPU rack 20, GPU rack 22, and/or DPU rack 24 may include DPUs. These DPUs, for example, may be responsible for various data processing tasks, such as networking, security, storage, and analytics, as well as related work acceleration, distribution and scheduling, and other such tasks. In some cases, the DPUs may be used in conjunction with application processors (e.g., a separate processing device, server, storage device or even a local CPU and/or local graphics processing unit (GPU) of the computing device hosting the DPU) to offload any data-processing intensive tasks and free the application processors for computing-intensive tasks. In other cases, where control plane tasks are relatively minor compared to the data-processing intensive tasks, the DPUs may take the place of the application processors.

CPU rack 20 hosts a number of CPU blades 21 or other compute nodes that are designed for providing a high-speed execution environment. That is, each CPU blade may contain a number of multi-core processors specially tailored to provide high-performance application execution. Similarly, GPU rack 22 may host a number of GPU blades 23 or other compute nodes that are designed to operate under the direction of a CPU or a DPU for performing complex mathematical and graphical operations better suited for GPUs. SSD rack 26 may host a number of SSD blades 27 or other storage nodes that contain permanent storage devices designed for storage and retrieval of data.

In general, various compute nodes within data center 10, such as any of CPU blades 21, GPU blades 23, and DPU blades 25, may include DPUs to perform data centric tasks within data center 10. In addition, various storage nodes within data center 10, such as any of SSD blades 27, may interact with DPUs within CPU blades 21, GPU blades 23, or DPU blades 25 to store data for the data centric tasks performed by the DPUs.

In the example shown in FIG. 1A, the set of racks 20, 22, 24, and 26 are connected to a high-speed switch fabric 14 via Ethernet links. Each of the racks holds a plurality of devices that may be interconnected within their respective racks via PCI-e links and/or Ethernet links. In addition, the devices included in the different racks 20, 22, 24, and 26 may be interconnected via PCI-e links and/or Ethernet links. In some examples, each of racks 20, 22, 24, and 26 may be a physical equipment rack having forty rack units (e.g., slots) in which to hold devices. In other examples, each of racks 20, 22, 24, and 26 may be logical racks or half-physical racks having twenty rack units. Each of the devices may be implemented as single- or multi-rack unit (RU) devices.

One or more of the devices in the different racks 20, 22, 24, or 26 may be configured to operate as storage systems and application servers for data center 10. For example, CPU rack 20 holds a plurality of CPU blades ("CPUs A-N") 21 that each includes at least a CPU. One or more of CPU blades 21 may include a CPU, a DPU, and one or more storage devices, e.g., SSDs, communicatively coupled via PCI-e links or buses. In this implementation, the DPU is configured to retrieve data from the storage devices on behalf of the CPU, store data to the storage devices on behalf of the CPU, and retrieve data from network 7 and/or switch fabric 14 on behalf of the CPU. One or more of CPU blades 21 may also include a GPU communicatively coupled to at least the DPU. In this case, the DPU is also configured to send offloaded processing tasks (e.g., graphics intensive processing tasks, or other tasks that may benefit from the highly parallel processing nature of a graphics processing unit) to the GPU. An example implementation of one of CPU blades 21 is described in more detail below with respect to computing device 30A of FIG. 1B.

In some examples, at least some of CPU blades 21 may not include their own DPUs, but instead are communicatively coupled to a DPU on another one of CPU blades 21. In other words, one DPU may be configured to control I/O and other data processing tasks for two or more CPUs on different ones of CPU blades 21. In still other examples, at least some of CPU blades 21 may not include their own DPUs, but instead are communicatively coupled to a DPU on one of DPU blades 25 held in DPU rack 24.

As another example, GPU rack 22 holds a plurality of GPU blades ("GPUs A-M") 23 that each includes at least a GPU. One or more of GPU blades 23 may include a GPU, a DPU, and one or more storage devices, e.g., SSDs, communicatively coupled via PCI-e links or buses. In this implementation, the DPU is configured to control input and output of data with network 7 and/or switch fabric 14, feed the data from at least one of network 7, switch fabric 14, or the storage devices to the GPU for processing, and control storage of the data with the storage devices. An example implementation of one of GPU blades 23 is described in more detail below with respect to computing device 30B of FIG. 1C.

In some examples, at least some of GPU blades 23 may not include their own DPUs, but instead are communicatively coupled to a DPU on another one of GPU blades 23. In other words, one DPU may be configured to control I/O tasks to feed data to two or more GPUs on different ones of GPU blades 23. In still other examples, at least some of GPU blades 23 may not include their own DPUs, but instead are communicatively coupled to a DPU on one of DPU blades 25 held in DPU rack 24.

As a further example, DPU rack 24 holds a plurality of DPU blades ("DPUs A-X") 25 that each includes at least a DPU. One or more of DPU blades 25 may include a DPU and one or more storage devices, e.g., SSDs, communicatively coupled via PCI-e links or buses such that DPU blades 25 may alternatively be referred to as "storage blades." In this implementation, the DPU is configured to control input and output of data with network 7 and/or switch fabric 14, perform programmable processing tasks on the data, and control storage of the data with the storage devices. An example implementation of one of DPU blades 25 is described in more detail below with respect to computing device 30C of FIG. 1D.

As illustrated in FIG. 1A, data center 10 may also include at least one separate, stand-alone, SSD rack 26 that holds a plurality of SSD blades ("SSDs A-Z") 27 that each includes at least one SSD device. The majority of SSD blades 27 do not include their own processors, e.g., no CPUs or DPUs are included on most of SSD blades 27. Instead, in one example, one of SSD blades 27 may include one or more DPUs that are communicatively coupled to each of the plurality of other SSD blades 27. In other examples, SSD rack 26 may include a DPU blade that includes one or more DPUs that are communicatively coupled to each of the plurality of SSD blades 27, or one or more DPUs on DPU blades 25 held in DPU rack 24 may be communicatively coupled to the plurality of SSD blades 27 held in SSD rack 26. In any implementation, the DPUs are configured to control input and output of data with network 7 and/or switch fabric 14, control input and output of data with application processors (e.g., CPUs on CPU blades 21 or GPUs on GPU blades 23), perform programmable processing tasks on the data, and control storage of the data with the SSDs on SSD blades 27. In this way, the scalability of storage is not tied to the scalability of processing in data center 10. Although illustrated in FIG. 1A as only including SSDs as storage devices for data center 10, in other examples, data center 10 may include one or more racks holding hard drive (HD) storage devices or a combination of SSD and HD storage devices.

In general, DPUs may be included on or communicatively coupled to any of CPU blades 21, GPU blades 23, DPU blades 25, and/or SSD blades 27 to provide computation services and storage facilities for applications and data associated with customers 11. In this way, the DPU may be viewed as a building block for building and scaling out data centers, such as data center 10.

In the illustrated example of FIG. 1A, each of racks 20, 22, 24, and 26 may include a top of rack (TOR) device through which each of the blades held in the physical rack may connect to switch fabric 14 via Ethernet links. In other examples, one or more of the physical racks may not include a TOR device and may instead connect directly to switch fabric 14 or connect to switch fabric 14 via another device that is not held in the physical rack itself. For example, DPU rack 24 may not include the illustrated TOR device, and instead each of the DPUs in DPU blades 25 may support a network interface through which to connect to switch fabric 14 directly via Ethernet links.

The DPUs or any of the devices within racks 20, 22, 24, and 26 that include at least one DPU may also be referred to as access nodes. In other words, the term DPU may be used herein interchangeably with the term access node. As access nodes, the DPUs may utilize switch fabric 14 to provide full mesh (any-to-any) interconnectivity such that any of the devices in racks 20, 22, 24, 26 may communicate stream data (e.g., data packets of a given packet flow) to any other of the devices using any of a number of parallel data paths within the data center 10. For example, the DPUs may be configured to spray individual packets for packet flows between the DPUs and across some or all of the multiple parallel data paths in the data center switch fabric 14 and reorder the packets for delivery to the destinations so as to provide full mesh connectivity.

Although racks 20, 22, 24, and 26 are described in FIG. 1A with respect to switch fabric 14 of data center 10, in other examples, the DPUs of the devices within racks 20, 22, 24, 26 may provide full mesh interconnectivity over any packet switched network. For example, the packet switched network may include a local area network (LAN), a wide area network (WAN), or a collection of one or more networks.

The packet switched network may have any topology, e.g., flat or multi-tiered, as long as there is full connectivity between the DPUs. The packet switched network may use any technology, including IP over Ethernet as well as other technologies. Irrespective of the type of packet switched network, the DPUs may spray individual data packets of packet flows between the DPUs and across multiple parallel data paths in the packet switched network and reorder the packets for delivery to the destinations so as to provide full mesh connectivity.

In the example of FIG. 1A, a software-defined networking (SDN) controller 18 provides a high-level controller for configuring and managing the routing and switching infrastructure of data center 10. SDN controller 18 provides a logically and in some cases physically centralized controller for facilitating operation of one or more virtual networks within data center 10 in accordance with one or more embodiments of this disclosure. In some examples, SDN controller 18 may operate in response to configuration input received from a network administrator.

In some examples, SDN controller 18 operates to configure the DPUs of the devices within racks 20, 22, 24, 26 to logically establish one or more virtual fabrics as overlay networks dynamically configured on top of the physical underlay network provided by switch fabric 14. For example, SDN controller 18 may learn and maintain knowledge of the DPUs and establish a communication control channel with each of the DPUs. SDN controller 18 uses its knowledge of the DPUs to define multiple sets (groups) of two of more DPUs to establish different virtual fabrics over switch fabric 14.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Figure 1B:
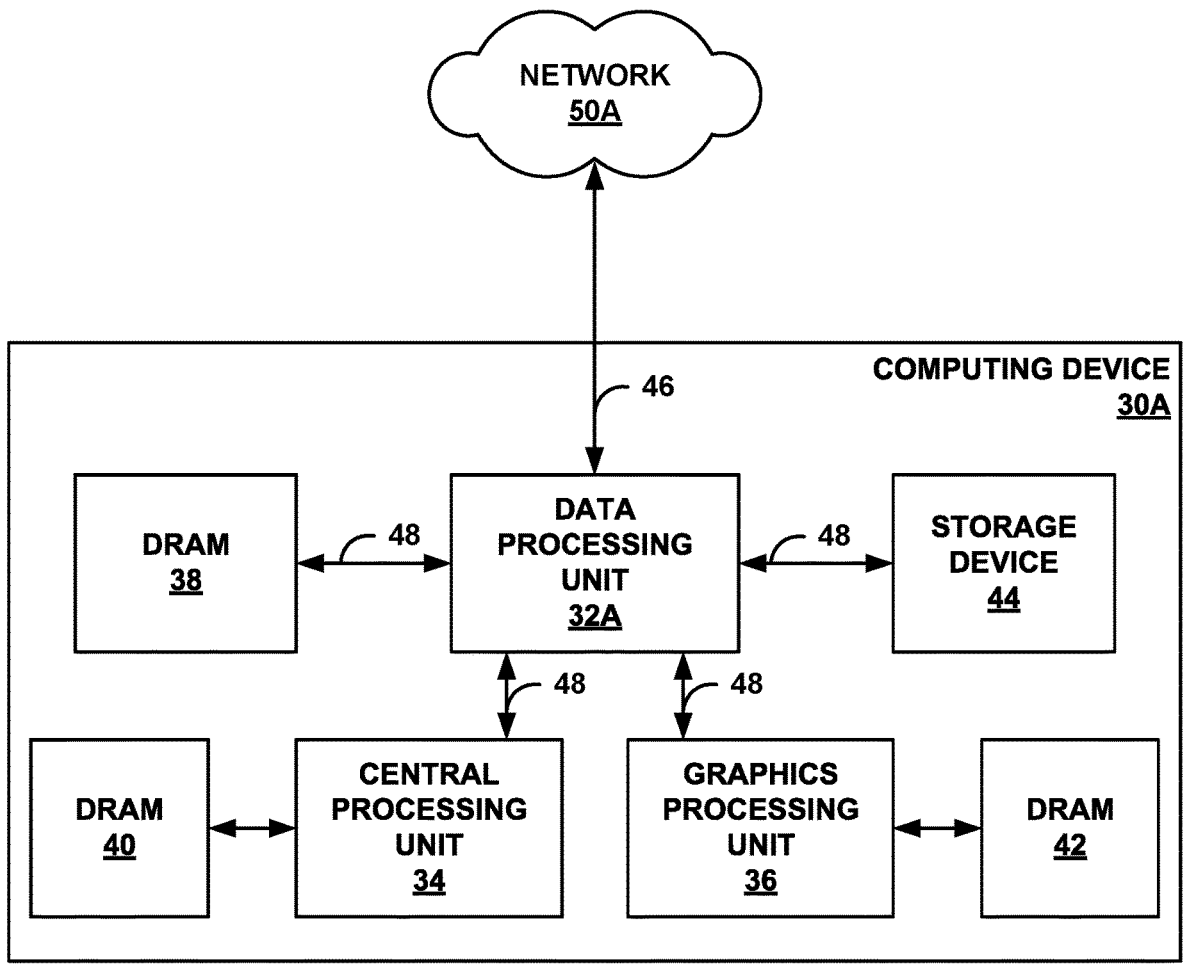

FIG. 1B is a block diagram illustrating an example computing device 30A including a data processing unit 32A configured according to the techniques of this disclosure and communicatively coupled to a central processing unit 34. Computing device 30A may represent a workstation computer, a server device, or the like. Computing device 30A may represent a server device of a plurality of server devices forming a data center. For example, computing device 30A may include at least one CPU, at least one DPU, at least one GPU, and at least one storage device, e.g., SSD. As another example, with respect to FIG. 1A, computing device 30A may represent at least one of CPU blades 21, or a combination of at least one of CPU blades 21, at least one of GPU blades 23, and at least one of DPU blades 25 of FIG. 1A that are communicatively coupled together.

In the example of FIG. 1B, computing device 30A includes DPU 32A, CPU 34, GPU 36, dynamic random access memory (DRAM) 38, 40, 42, and storage device 44. DPU 32A is coupled to CPU 34, GPU 36, DRAM 38, and storage device 44 via host interfaces, Peripheral Component Interconnect-Express (PCI-e) buses 48 in this example. DPU 32A also acts as a network interface for computing device 30A to network 50A, which may represent the Internet. Network 50A may be substantially similar to network 7 and/or switch fabric 14 from FIG. 1A. DPU 32A is coupled to a device (e.g., a provider edge router of network 50A, not shown) to access network 50A via Ethernet link 46, in this example. DPU 32A is positioned between and communicatively coupled to CPU 34, storage device 44, and GPU 36. Although only one storage device 44 is shown, it should be understood that multiple such storage devices may be included within or coupled to computing device 30A (and DPU 32A may be coupled to each of the storage devices, e.g., via PCI-e buses).

DPU 32A may be configured according to the various techniques of this disclosure. DPU 32A is a highly programmable I/O processor with a plurality of processing cores (as discussed below, e.g., with respect to FIG. 2). Two or more of the processing cores execute a run-to-completion data plane operating system configured to support software functions for performing data processing tasks on behalf of CPU 34, and one or more of the processing cores execute a multi-tasking control plane operating system. In addition, the multi-core processor is equipped with hardware engines that allow CPU 34 to offload various processes, such as cryptographic functions, compression, and regular expression processing. DPU 32A is a network interface subsystem that can form a nexus between various components and devices, e.g., CPU 34, GPU 36, storage device 44, and network devices of network 50A.

In the example of FIG. 1B, DPU 32A provides access between network 50A, storage device 44, GPU 36, and CPU 34. In other examples, a DPU such as DPU 32A may aggregate and process network and SSD I/O to multiple server devices including application processors. In this manner, DPU 32A is configured to retrieve data from storage device 44 on behalf of CPU 34, store data to storage device 44 on behalf of CPU 34, and retrieve data from network 50A on behalf of CPU 34. Furthermore, DPU 32A is also configured to send offloaded processing tasks (e.g., graphics intensive processing tasks, or other tasks that may benefit from the highly parallel processing nature of a graphics processing unit) to GPU 36, to receive output for the offloaded processing tasks from GPU 36, and to provide the output for the offloaded processing tasks to CPU 34.

In general, software programs executable on CPU 34 can perform instructions to offload some or all data-intensive processing tasks associated with the software program to DPU 32A. Each of the processing cores of DPU 32A may be programmable using a high-level programming language, e.g., C, C++, or the like. In general, the various hardware implementations of processes provided by DPU 32A may be associated with software libraries in the high-level programming language that may be utilized to construct software applications for execution by CPU 34 that, by way of the host interfaces, invoke and leverage the functionality of DPU 32A. Thus, a programmer can write a software program in the programming language and use function or procedure calls associated with the hardware implementations of various processes of DPU 32A to perform these functions, and when CPU 34 executes the software program, CPU 34 offloads performance of these functions/procedures to DPU 32A.

Additionally, or alternatively, CPU 34 may offload other software procedures or functions to DPU 32A to be executed by processing cores of DPU 32A. Furthermore, CPU 34 may offload software procedures or functions to GPU 36 via DPU 32A (e.g., computer graphics processes). In this manner, DPU 32A represents a dynamically programmable processing unit that can execute software instructions, as well as provide hardware implementations of various procedures or functions for data-processing tasks, which may improve performance of these procedures or functions.

Figure 1C:
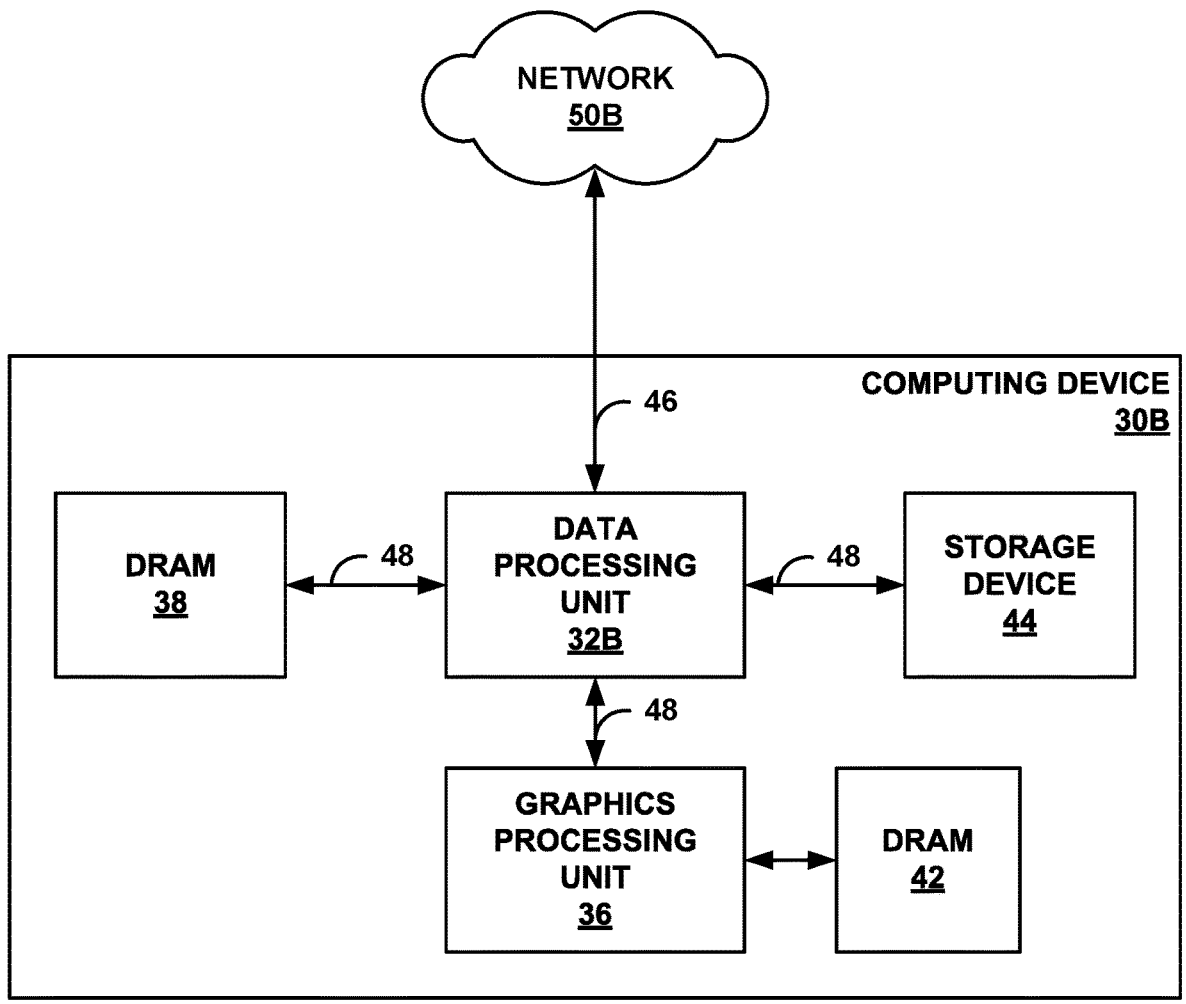

FIG. 1C is a block diagram illustrating an example computing device 30B including a DPU 32B configured according to the techniques of this disclosure and communicatively coupled to a GPU 36. Computing device 30B may represent a workstation computer, a server device, or the like. Computing device 30B may represent a server device of a plurality of server devices forming a data center. For example, computing device 30B may include at least one DPU, at least one GPU, and at least one storage device, e.g., SSD. As another example, with respect to FIG. 1A, computing device 30B may represent at least one of GPU blades 23, or a combination of at least one of GPU blades 23 and at least one of DPU blades 25 that are communicatively coupled together.

In the example of FIG. 1C, computing device 30B includes DPU 32B, GPU 36, DRAM 38, 42, and storage device 44. DPU 32B is coupled to GPU 36, DRAM 38, and storage device 44 via host interfaces, PCI-e buses 48 in this example. DPU 32B also acts as a network interface for computing device 30B to network 50B, which may represent the Internet. Network 50B may be substantially similar to network 7 and/or switch fabric 14 from FIG. 1A. DPU 32B is coupled to a device (e.g., a provider edge router of network 50B, not shown) to access network 50B via Ethernet link 46, in this example. DPU 32B is positioned between and communicatively coupled to storage device 44 and GPU 36. Although only one storage device 44 is shown, it should be understood that multiple such storage devices may be included within or coupled to computing device 30B (and DPU 32B may be coupled to each of the storage devices, e.g., via PCI-e buses).

DPU 32B may be configured according to the various techniques of this disclosure. DPU 32B may operate substantially similar to DPU 32A described above with respect to FIG. 1B. DPU 32B is a highly programmable I/O processor with a plurality of processing cores (as discussed below, e.g., with respect to FIG. 2). Two or more of the processing cores execute a run-to-completion data plane operating system configured to support software functions for performing data processing tasks, and one or more of the processing cores execute a multi-tasking control plane operating system. The multi-core processor is also equipped with specific hardware units configured specifically to implement various data-intensive operations. DPU 32B is a network interface subsystem that can form a nexus between various components and devices, e.g., storage device 44, GPU 36, and network devices of network 50B.

In the example of FIG. 1C, DPU 32B provides access between network 50B, storage device 44, and GPU 36. In other examples, a DPU such as DPU 32B may aggregate and process network and SSD I/O to multiple server devices including application processors. DPU 32B may operate as a control plane (e.g., essentially a CPU) for computing device 30B to facilitate data processing by GPU 36. In this manner, DPU 32B is configured to control input and output of data with network 50B. Furthermore, DPU 32B is also configured to feed data from at least one of network 50B or storage device 44 to GPU 36 for processing (e.g., graphics intensive processing, or other processing tasks that may benefit from the highly parallel processing nature of a graphics processing unit), and receive output of the processing from GPU 36. DPU 32B is further configured to control storage of data that is received from network 50B and/or processed by either DPU 32B or GPU 36 with storage device 44.

As an example, in the case of artificial intelligence (AI) processing, control plane functions include executing control tasks to instruct a GPU to perform certain types of computationally intensive processing, and executing I/O tasks to feed a large amount of data to the GPU for processing. In general, I/O processing tasks that control data movement between GPUs and storage devices are more important for facilitating AI processing than the relatively minor control tasks. Therefore, in the example of AI processing, it makes sense to use DPU 32B in place of a CPU. In the example of FIG. 1C, DPU 32B instructs GPU 36 to perform matrix/linear algebra on data from network 50B or storage device 44, and feeds data to and from GPU 36.

Figure 1D:
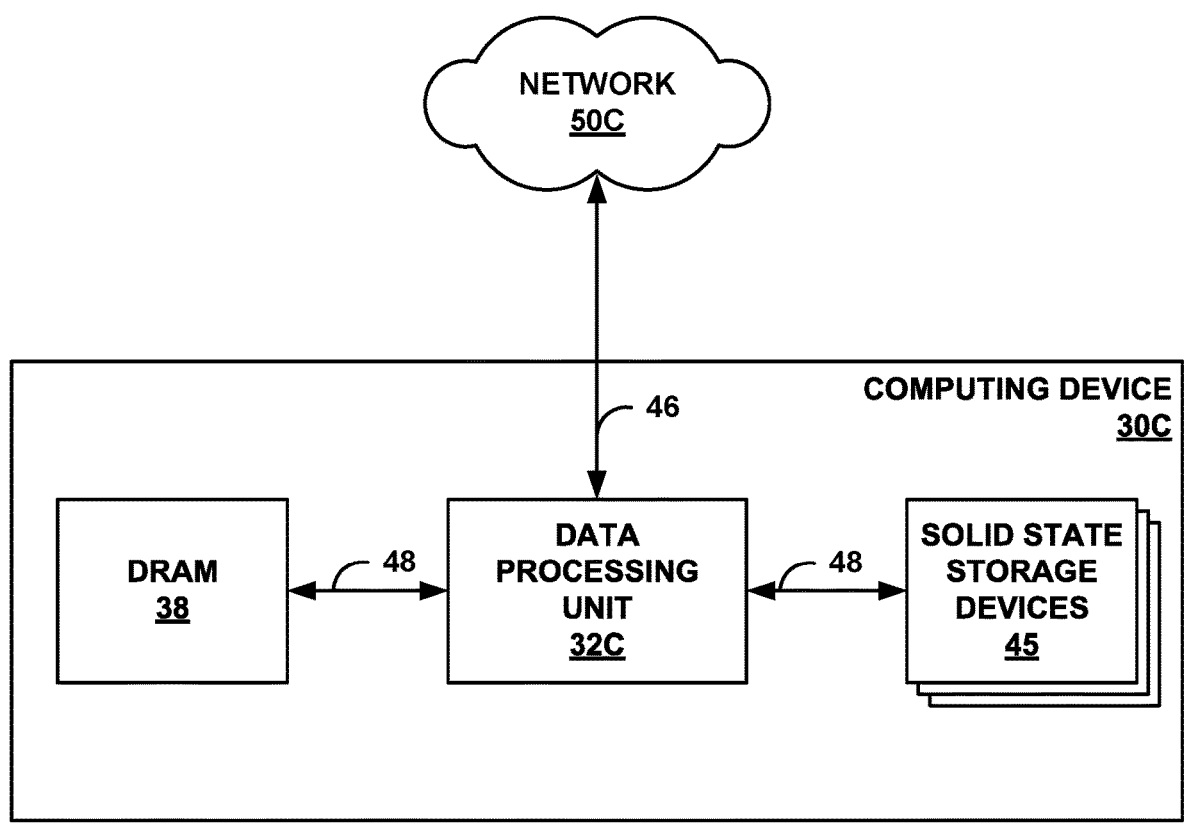

FIG. 1D is a block diagram illustrating an example computing device 30C including a data processing unit 32C configured according to the techniques of this disclosure and communicatively coupled to a plurality of solid state storage devices 45. Computing device 30C may represent a workstation computer, a server device, or the like. Computing device 30C may represent a server device of a plurality of server devices forming a data center. For example, computing device 30D may include at least one DPU and at least one storage device, e.g., SSD. As another example, with respect to FIG. 1A, computing device 30C may represent at least one of DPU blades 25, or a combination of at least one of DPU blades 25 and one or more SSD blades 27 that are communicatively coupled together.

In the example of FIG. 1D, computing device 30C includes DPU 32C, DRAM 38, and a plurality of solid state storage devices (e.g., SSDs) 45. DPU 32C is coupled to DRAM 38 and SSDs 45 via host interfaces, PCI-e buses 48 in this example. DPU 32C also acts as a network interface for computing device 30C to network 50C, which may represent the Internet. Network 50C may be substantially similar to network 7 and/or switch fabric 14 from FIG. 1A. DPU 32C is coupled to a device (e.g., a provider edge router of network 50C, not shown) to access network 50C via Ethernet link 46, in this example.

DPU 32C may be configured according to the various techniques of this disclosure. DPU 32C may operate substantially similar to DPU 32A of FIG. 1B or DPU 32B of FIG. 1C. DPU 32C is a highly programmable I/O processor with a plurality of processing cores (as discussed below, e.g., with respect to FIG. 2). Two or more of the processing cores execute a run-to-completion data plane operating system configured to support software functions for performing data processing tasks, and one or more of the processing cores execute a multi-tasking control plane operating system. The multi-core processor is also equipped with specific hardware units configured specifically to implement various data-intensive operations. DPU 32C is a network interface subsystem that can form a nexus between various components and devices, e.g., SSDs 45 and network devices of network 50C.

In the example of FIG. 1D, DPU 32C provides access between network 50C and SSDs 45. In other examples, a DPU such as DPU 32C may aggregate and process network and SSD I/O to multiple server devices including application processors. DPU 32C may operate as a control plane (e.g., essentially a CPU) for computing device 30C to facilitate data storage and retrieval from SSDs 45. In this manner, DPU 32C is configured to control input and output of data with network 50C. Furthermore, DPU 32C is also configured to perform programmable processing tasks on data that is received from network 50C or retrieved from SSDs 45. DPU 32C is further configured to control storage of data that is received from network 50C and/or processed by DPU 50C with SSSDs 45. In one example, SSDs 45 may comprise an entire rack of SSD blades that each include at least one SSD device, e.g., SSD rack 26 of FIG. 1A. In this example, the I/O processing tasks to control data movement between the network and the SSDs are more important than the relatively minor control tasks associated with data storage. Therefore, in the example of storage management, it makes sense to use DPU 32C in place of a CPU.

Example hardware architectures of a DPU is described below with respect to FIG. 2. The hardware architectures of the DPU are optimized for high performance and high efficiency stream processing. A stream is defined as an ordered, unidirectional sequence of computational objects (referred to herein as stream data units generally or, as a specific example, data packets of a packet flow) that can be of unbounded or undetermined length. In a simple example, a stream originates in a source block (e.g., producer) and terminates at a destination block (e.g., consumer), and is operated on sequentially. In some examples, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. Independent of the stream type, stream manipulation requires efficient fragment manipulation.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within a DPU can safely access different windows within the stream.

As described herein, processing of stream information may be associated with a "work unit." A work unit (WU) is a container that is associated with a stream state and used to describe (i.e. point to) data within a stream (stored in memory) along with any associated meta-data and operations to be performed on the data. Work units may dynamically originate within a peripheral unit of a DPU (e.g. injected by a networking unit, a host unit, or a storage device interface) or within a processor of the DPU in association with one or more streams of data, and terminate at another peripheral unit or another processor of the DPU. Stream processing is typically initiated as a result of receiving one or more work units associated with respective portions of the stream, e.g., one or more stream data units (e.g., data packets of a packet flow).

Figure 2:
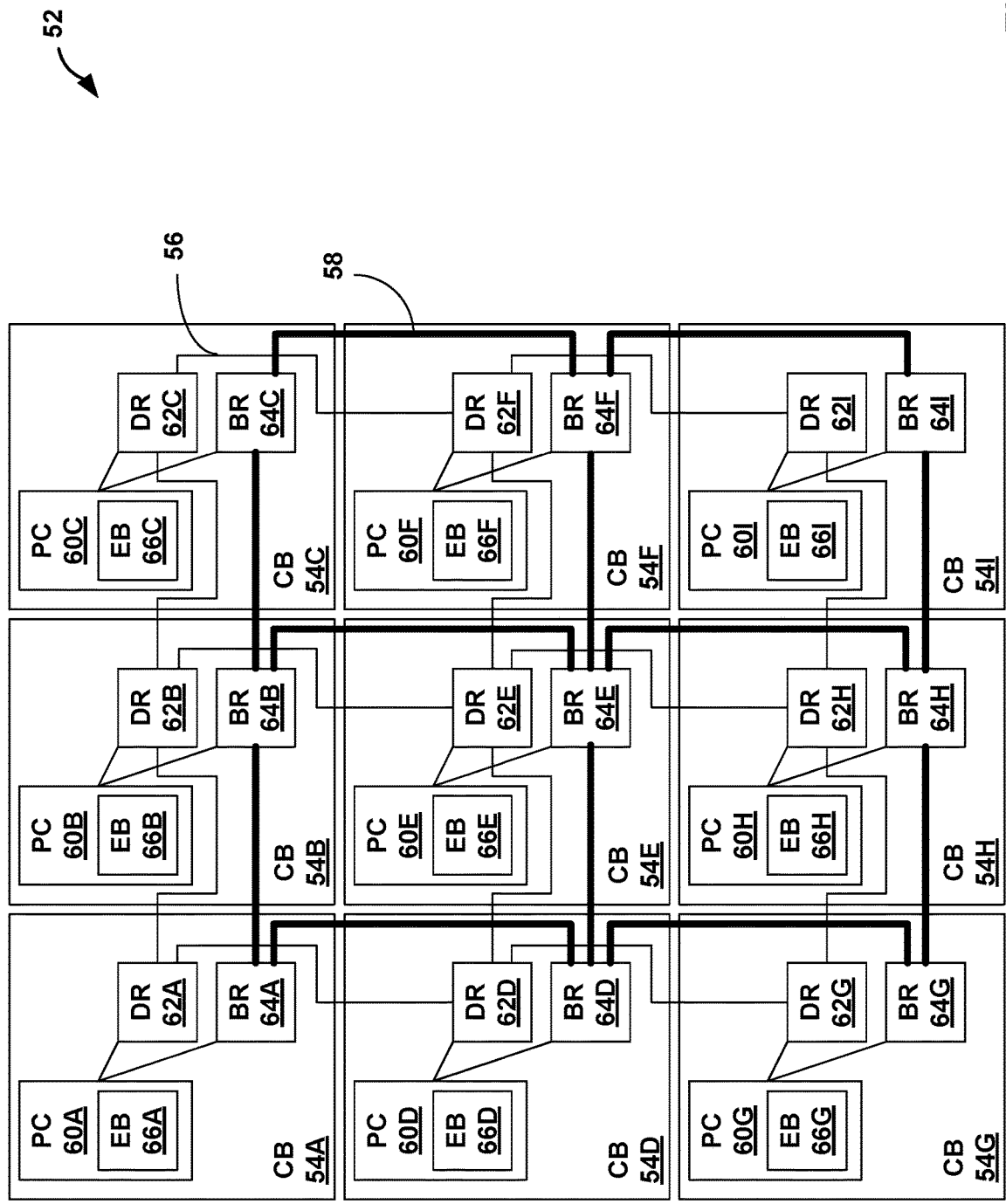
FIG. 2 is a block diagram illustrating hardware components of an example data processing unit, in accordance with the techniques of this disclosure.

FIG. 2 is a block diagram illustrating a data processing unit (DPU) 52. DPU 52 is an example of DPUs 32A, 32B, and 32C. DPU 52 includes a plurality of circuit blocks (CBs) 54A-54I (collectively "circuit blocks 54") that are interconnected with a communication fabric. There may be more or fewer circuit blocks 54 than illustrated in FIG. 2. In the example illustrated in FIG. 2, DPU 52 includes communication mesh 56 that includes a plurality of data lines to carry the data units of a WU, and includes congestion mesh 58 that includes a plurality of congestion lines to carry information indicative of rates at which data is to be transmitted to respective circuit blocks 54A-54I so as to minimize congestion on communication mesh.

As illustrated in FIG. 2, each one of the circuit blocks 54 includes a respective one of processing circuitry (PC) 60A-60I (collectively "processing circuitry 60") and a respective one of data routers (DRs) 62A-62I (collectively "data routers 62"). Examples of processing circuitry 60 include processing cores, I/O circuitry, network circuitry, memory circuitry, and the like that facilitate the processing of data units. In FIG. 2, each one of circuit blocks 54 includes a respective one of broadcast router (BR) 64A-64I (collectively "broadcast routers 64"). As described in more detail, broadcast routers 64 may be configured to output information indicative of a rate at which respective circuit blocks 54 are to receive data units via congestion mesh 58.

Congestion mesh 58 may also be configured to route the information in a manner that accounts for relative positions of circuit blocks 54. For example, broadcast routers 64 may be considered as part of congestion mesh 58 for routing of information. In some examples, each broadcast routers 64 (e.g., broadcast router 64E) may receive data from different ones of broadcast routers 64 but may only forward the data from one of broadcast routers 64 from which broadcast router 64E received data. This disclosure described example ways in which broadcast routers 64 route data along congestion mesh 58 based on relative positions of circuit blocks 54 (e.g., based on relative positions of broadcast routers 64 in their respective circuit bocks 54). In this manner, congestion mesh 58 route information in a manner that accounts for relative positions of circuit blocks 54 in congestion mesh 58.

Each one of processing circuitry 60 may include respective ones of egress buffers (EB) 66A-66I. Egress buffers 66 are configured to temporarily store data units that are to be processed by the respective ones of processing circuitry 60. For example, when processing circuitry 60A is to process a data unit, the data unit is read from egress buffer 66A. In some examples, egress buffers 66 are first-in-first-out (FIFO) buffers. Reading a data unit from a buffer may include a pop operation, a dequeue operation, or other read operation. Reading a data unit from a buffer may include modifying the buffer.

Circuit blocks 54 are illustrated as an example and should not be considered limiting. For instance, in some examples, data routers 62 and broadcast routers 64 may be combined into a common router. In some examples, processing circuitry 60 may include respective data routers 62 and broadcast routers 64 or the combined common router. In some examples, respective ones of egress buffers 66 may be part of data routers 62 rather than processing circuitry 60. Accordingly, there may be a variety of arrangements of processing circuitry 60, data routers 62, broadcast routers 64, and egress buffers 66, and the various arrangements are contemplated in this disclosure. Each one of circuit blocks 54 may be considered as a group of one or more circuit blocks that configured to generate, transmit, receive, and process data units via the communication fabric of DPU 52.

Communication mesh 56 is a shared resource that is used to carry data units between circuit blocks 54. As illustrated in FIG. 2, each one of data routers 62 are coupled to one or more other data routers 62 via the plurality of data lines of communication mesh 56. Communication mesh 56 is illustrated as a 2D mesh, but other mesh configurations are possible.

As an example, assume that circuit block 54A is a source block that is transmitting data units to circuit block 54I, which is a destination block. In this example, data router 62A transmits the data unit to data router 62B via one or more data lines of communication mesh 56, which forwards the data unit to data router 62C via one or more data lines of communication mesh 56, which forwards the data unit to data router 62F via one or more data lines of communication mesh 56, and which forwards the data unit to data router 62I via one or more data lines of communication mesh 56. Data router 62I is part of the destination block (e.g., circuit block 54I). Data router 62I transmits the data unit to egress buffer 66I for eventual processing by processing circuitry 60I. There may be other paths from the source block (e.g., circuit block 54A) to the destination block (e.g., circuit block 54I).

In some cases, if processing circuitry 60I is unable to process the data units at a sufficient rate, there may be congestion on communication mesh 56. For example, egress buffer 66I may become full because processing circuitry 60I is not reading data units fast enough and therefore there is a backup of data units on communication mesh 56 (e.g., congestion on communication mesh 56). Because communication mesh 56 is a shared resource, the congestion can increase latency in the transfer of data units between two different circuit blocks 54 that are not necessarily the cause of the congestion. For instance, if circuit block 54B (e.g., circuit block 54B is a source block) were transmitting data units to circuit block 54F (e.g., circuit block 54F is a destination block), then the congestion on communication mesh 56 due to the slow rate at which processing circuitry 60I is processing data units can increase the latency of data units from circuit block 54B reaching circuit block 54F.

Accordingly, because communication mesh 56 is a shared resource and is used to carry data units between any two circuit blocks 54, there may be complication in providing quality-of-service guarantees for the different flows, where a flow is referred to traffic between different source-destination blocks. For example, the congestion caused by processing circuitry 60I makes it hard for circuit blocks 54B and 54F to guarantee that data units from circuit block 54B will be received and processed in a timely fashion by circuit block 54F.

Moreover, communication mesh 56 may be a no-drop communication fabric and any slow-down at a destination block will propagate up to the source block via hop-by-hop flow control. There is a relatively high chance that a single one of circuit blocks 54 that is processing too slowly (e.g., has a slow drain rate) can impact communication throughput communication mesh 56, and consequently degrade the performance of DPU 52.

A drain rate is indicative of a rate at which processing circuitry 60 is processing data units. One way in which to determine the drain rate is a rate at which processing circuitry 60 is reading data units from respective ones of egress buffers 66. For instance, if the drain rate is relatively high, then respective ones of egress buffers 66 may have low occupancy (e.g., relatively empty) because data units are being read from egress buffers 66 at a relatively high rate, but if the drain rate is relatively low, then respective ones of egress buffers 66 would have a high occupancy (e.g., relatively full) because data units are being read from egress buffers 66 at a relatively low rate.

There may be various causes for why a particular processing circuitry 60 has a slow drain rate. As one example, there may be plurality of source blocks (e.g., plurality of circuit blocks 54) that are transmitting to the same destination block, and the drain rate of the destination block is less than the rate at which the destination block is receiving the data units. As described above, the congestion in communication mesh 56 may result in build-up of data (queues) and these blocked data units may block data units to other uncongested destinations due to head-of-line blocking in the queues within communication mesh 56.

This disclosure describes example techniques that allow a destination block to broadcast to all other circuit blocks 54 information indicative of a rate at which circuit blocks 54 should transmit data units to the destination block. This way, source blocks that are transmitting to the destination block can control the rate at which data units are being transmitted to reduce the amount of data units being carried in communication mesh 56 thereby reducing congestion of communication mesh 56 and reducing the collateral effects of the slow drain rate of the destination block on data unit flow between other circuit blocks 54. In other words, by controlling the rate at which data units are being transmitted to a destination block there is a reduction in chance that an egress buffer 66 for the destination block overflows and causes congestion on communication mesh 56.

One example way in which to determine a rate at which data units are to be transmitted to a destination block is based on an occupancy of its egress buffer and a drain rate of the destination block. Example techniques to determine the rate at which data units are to be transmitted is described in more detail below.

As described above, once a destination block determines the rate at which data units are to be transmitted, the destination block may broadcast information indicative of the determined rate to the other circuit blocks 54. There may be technical benefits to broadcasting information indicative of the determined rate, rather than transmitting information indicative of the determined rate only to the source blocks that are transmitting data units to the destination block. For example, in DPU 52, there may be frequent changes in source blocks and destination blocks. Also, there may be frequent changes in how many source blocks transmit to a destination block. Therefore, by each one of circuit blocks 54 receiving information indicative of a rate at which data is to be transmitted to other circuit blocks 54, when a first one of circuit blocks 54 (e.g., a source block) is to transmit to a second one of circuit blocks 54 (e.g., a destination block), the first one of circuit blocks 54 already knows a rate at which to transmit data units to the second one of circuit blocks 54.

To broadcast the information indicative of a rate at which data units are to be transmitted, each one of circuit blocks 54 includes a respective one of broadcast routers 64A-64I (collectively "broadcast routers 64"). Each one of broadcast routers 64 is coupled to congestion mesh 58 that includes a plurality of congestion lines to carry information indicative of a rate at which data units are to be transmitted.

Congestion mesh 58 may be a dedicate set of lines that are different than the lines of communication mesh 56. For instance, if there is congestion on communication mesh 56 and if information indicative of the rate at which data units are to be transmitted is outputted on the same communication mesh 56, then the additional information indicative of the rate at which data units are to be transmitted will cause additional congestion on communication mesh 56. However, by having a dedicated set of lines used to specifically carry information indicative of a rate at which data units are to be transmitted, such as lines of congestion mesh 58, the information indicative of the rate at which data units are to be transmitted may not add to congestion on communication mesh 56.

In some examples, the number of congestion lines in congestion mesh 58 is equal to the number of circuit blocks in DPU 52. For instance, in the example of FIG. 2, there may be 9 lines in congestion mesh 58 because there are 9 circuit blocks 54. In some examples, the inclusion of congestion mesh 58 add approximately 4% overhead to the number of lines needed in the communication fabric. As one example, DPU 52 may include 24 circuit blocks 54, and the number of lines in communication mesh 56 is equal to 512. In this example, there may be 24 lines in congestion mesh 58 for approximately 4% overhead (e.g., $24/512$ is approximately 4%). The above example of 512 lines in communication mesh 56 and 24 circuit blocks 54 resulting in 24 lines for congestion mesh 58 is merely one example and should not be considered limiting.

Congestion mesh 58 and communication mesh 56 may both be the same type of mesh (e.g., 2D mesh). However, the example techniques are not so limited. In some examples, congestion mesh 58 and communication mesh 56 are different types of meshes. For ease of description, congestion mesh 58 is described as being a 2D mesh.

In such examples, such as where the number of lines in congestion mesh 58 is equal to the number of circuit blocks 54, each line in congestion mesh 58 forms a one-bit 2D mesh for one of circuit blocks 54. For example, a first line of congestion mesh 58 may carry information indicative of the data rate at which circuit blocks 54 are to transmit to circuit block 54A, and the first line may carry such information one-bit at a time. That is, there is serial communication of the information indicative of the rate at which circuit blocks 54 are to transmit to circuit block 54A via the first line. A second line of congestion mesh 58 may carry information indicative of the data rate at which circuit blocks 54 are to transmit to circuit block 54B, and the second line may carry such information one-bit at a time, and so forth. There is serial communication of the information indicative of the rate at which circuit blocks 54 are to transmit to circuit block 54B via the second line, and so forth.

Broadcast routers 64 transmits the information indicative of the rate at which data units are to be transmitted in a serial communication. By serializing the information indicative of the rate at which data units are to be transmitted over a one-bit 2D mesh, the example techniques may provide a high rate for communicating the information indicative of a rate at which data units are to be transmitted and keep the cost of congestion mesh 58 down to one-bit per circuit block 54. For instance, as described above, congestion mesh 58 may only add 4% overhead.

The above example is merely one example way in which information may be communicated on congestion mesh 58. The example communication technique described above should not be considered limiting. For instance, in some examples, each one of circuit blocks 54 may be assigned a time slot within which to transmit information indicative of the data rate at which circuit blocks 54 are to transmit data units, and each one of circuit blocks 54 may transmit information during assigned time slots, and in some cases, transmit in parallel across the lines of congestion mesh 58. Other ways in which to transmit information indicative of the rate at which data units are to be transmitted are possible.

As illustrated in FIG. 2, each one of broadcast routers 64 is coupled to one or more other broadcast routers 64. For instance, broadcast router 64E is coupled to broadcast routers 64B, 64D, 64F, and 64H. Therefore, broadcast router 64E receives information indicative of a rate at which data units are to be transmitted to circuit blocks 54B, 54D, 54F, and 54H. In one or more examples, broadcast router 64E may need to further broadcast the received information. For instance, circuit block 54B may need to determine the rate at which to transmit to circuit block 54D. However, broadcast router 64B is not directly coupled to broadcast router 64D. Directly coupled may mean that two broadcast routers 64 are coupled to one another without an intermediate one of broadcast routers 64. There may be intermediate components like amplifiers but not another broadcast router between two directly coupled broadcast routers 64. Therefore, broadcast router 64E may need to further broadcast the information indicative of the rate at which data units are to be transmitted to circuit block 54D to circuit block 54B. However, the same would be true for broadcast router 64E further transmitting information received from broadcast routers 64F and 64H.

In some examples, broadcast router 64E further transmits information indicative of the rate at which data units are to be transmitted received from one of circuit blocks 54B, 54D, 54F, and 54H, such as based on relative positions of circuit blocks 54B, 54D, 54F, and 54H to circuit block 54E. In such examples, broadcast router 64E broadcasts the information from one of circuit blocks 54B, 54D, 54F, and 54H to other broadcast routers 64 with which broadcast router 64E is directly coupled.

For instance, broadcast routers 64 may be 5-port routers having bidirectional input and output ports. Using broadcast router 64E as an example, a first port of broadcast router 64E is coupled to broadcast router 64B, which is "North" of broadcast router 64E. Broadcast router 64E transmits data units to and receives data units from broadcast router 64B via the first port. A second port of broadcast router 64E is coupled to broadcast router 64F, which is "East" of broadcast router 64E. Broadcast router 64E transmits data units to and receives data units from broadcast router 64F via the second port. A third port of broadcast router 64E is coupled to broadcast router 64H, which is "South" of broadcast router 64E. Broadcast router 64E transmits data units to and receives data units from broadcast router 64H via the third port. A fourth port of broadcast router 64E is coupled to broadcast router 64D, which is "West" of broadcast router 64E. Broadcast router 64E transmits data units to and receives data units from broadcast router 64E via the fourth port. A fifth port of broadcast router 64E is coupled to processing circuitry 60E to transmit data units to and receive data units from processing circuitry 60E. The fifth port is the injection and rejection port that is connected to processing circuitry 60E. The other broadcast routers 64 may be similarly configured as broadcast router 64E.

In this way, broadcast router 64E does not need to further transmit information received from all broadcast routers 64 with which broadcast router 64E is directly coupled. As described in more detail below, each one of broadcast routers 64 may be configured to perform an algorithm that allows broadcast routers 64 to listen for inputs on all ports, but output information from only one of the ports. The example algorithm may ensure that, even though only information received on only one port is broadcasted, each of circuit blocks 54 receive information indicative of a rate at which to transmit to each of the other circuit blocks 54.

As described above, each one of circuit blocks 54 may be configured to determine a rate at which data units are to be transmitted to circuit blocks 54. For ease of description, the following is described with respect to circuit block 54A. For example, circuit block 54A is a destination block to which one or more other circuit blocks 54 (e.g., one or more source blocks) are transmitted data units using communication mesh 58. Each of the other circuit blocks 54 may perform similar operations. Also, the example techniques are described with circuit block 54A performing the example operations. For instance, broadcast router 64A, processing circuitry 60A, or some other circuit components of circuit block 54A may be configured to perform the example operations.

In general, circuit block 54A (e.g., the destination block) may be configured to determine a rate at which data units should be transmitted to circuit block 54A so that occupancy of egress buffer 66A (e.g., amount of data units stored in egress buffer 66A) is kept at a desired level. For instance, as the occupancy of egress buffer 66A increases, circuit block 54A may determine that the rate at which data units are to be transmitted to circuit block 54A should be reduced. Circuit block 54A may determine that rate at which data units are transmitted to circuit block 54A should be increased or decreased so that the injection rate (e.g., rate at which circuit block 54A is receiving data and injecting into egress buffer 66A) is the same as the ejection rate (e.g., rate at which circuit block 54A is processing data and ejecting from egress buffer 66A). Because flows are very dynamic and short-lived (e.g., from where and how many sources circuit block 54A receives data units is dynamic and short-lived), DPU 52 may not reach a steady state where the injection and ejection rates to circuit block 54A are equally matched. However, by broadcasting the rate at which data units are to be transmitted to circuit block 54A via congestion mesh 58, there is relatively fast feedback to control the rate at which data units are transmitted to circuit block 54A.

When the occupancy of egress buffer 66A is less than a first threshold, circuit block 54A may determine that there is no need to reduce the rate at which source blocks are transmitting to circuit block 54A. In this example, broadcast router 64A broadcasts information that the rate at which data units are to be transmitted to circuit block 54A can be the maximum transmit rate (e.g., needs no change). For instance, if the maximum rate at which circuit blocks 54 transmit data units is eight data units within a time window of 8 cycles, then circuit block 54A, via broadcast router 64A, broadcasts a value of eight to indicate that the sources can send data at the maximum rate.

When the occupancy of egress buffer 66A is greater than a first threshold and less than or equal to a second threshold, circuit block 54A may determine a drain rate of egress buffer 66A (e.g., a rate at which processing circuitry 60A is processing data units based on a rate at which data units are being outputted by egress buffer 66A). In this example, circuit block 54A may broadcast the drain rate to the sources. For instance, if the measured drain rate is 6 data units in a time window of 8 cycles, then circuit block 54A, via broadcast router 64A, broadcasts a value of 6 to indicate that the sources can send at a rate of 6 data units every 8 cycles.

When the occupancy of egress buffer 66A is greater than a second threshold and less than or equal to a third threshold, circuit block 54A may determine a drain rate of egress buffer 66A (e.g., a rate at which processing circuitry 60A is processing data units based on a rate at which data units are being outputted by egress buffer 66A). In this example, circuit block 54A may scale the determine rate by a certain factor (e.g., divide the drain rate by 2) to generate a first scaled rate. Circuit block 54A broadcasts, via broadcast router 64A, the first scaled rate as the rate at which data units are to be transmitted to circuit block 54A. As a non-limiting example, the buildup may be considered as indicating that there is more than one source transmitting data to the destination and the scaling factor of rate advertised to sources (e.g., source blocks) is an estimate of the number of sources simultaneously sending data to the destination.

When the occupancy of egress buffer 66A is greater than a third threshold and less than or equal to a fourth threshold, circuit block 54A may determine a drain rate of egress buffer 66A (e.g., a rate at which processing circuitry 60A is processing data units based on a rate at which data units are being outputted by egress buffer 66A). In this example, circuit block 54A may scale the determine rate by a certain factor (e.g., divide the drain rate by 4) to generate a second scaled rate. Circuit block 54A broadcasts, via broadcast router 64A, the second scaled rate as the rate at which data units are to be transmitted to circuit block 54A.

When the occupancy of egress buffer 66A is greater than the fourth threshold, circuit block 54A may determine that data units should not be transmitted to circuit block 54A. In this example, circuit block 54A broadcasts, via broadcast router 64A, a value of 0 to indicate that data units should not be transmitted to circuit block 54A.

The occupancy of egress buffer 66A may be used as a proxy for the number of source blocks sending data to circuit block 54A. For example, when the egress buffer occupancy is low, the assumption is that only a single source is sending data to circuit block 54A. Hence, circuit block 54A broadcasts that the rate at which data units are to be transmitted to circuit block 54A is equal to the drain rate. If egress buffer 66A occupancy exceeds a second threshold, there may be two source blocks are sending data units to circuit block 54A, and circuit block 54A broadcasts half of the drain rate to all other circuit blocks 54 in order to match total injection and drain rates. If egress buffer 66A occupancy continues to increase and exceeds a second threshold, there may be four source blocks that are sending data units to circuit block 54A, and circuit block 54A broadcasts quarter of the drain rate to all other circuit blocks 54 in order to match total injection and drain rates. If egress buffer 66A is close to full, circuit block 54A may broadcast a drain rate of 0, in order to prevent egress buffer 66A from overflowing to communication mesh 56.

The above thresholds and scaling factors are merely one example, and more or fewer thresholds and different scaling factors may be used to determine a rate at which data units are to be transmitted to circuit block 54A. For instance, there may be multiple such thresholds that proportionately scales the rate broadcasted to the other circuit blocks 54. Accordingly, circuit block 54A (e.g., a destination block) may be associated with egress buffer 66A. To determine information indicative of the rate at which data units are to be transmitted to circuit block 54A, circuit block 54A may be configured to determine an occupancy value of egress buffer 66A and determine a drain rate of egress buffer 66A. The drain rate is indicative of a rate at which data units are outputted from egress buffer 66A for processing by circuit block 54A (e.g., processing circuitry 60A). Circuit block 54A may determine the information indicative of the rate at which data units are to be transmitted to circuit block 54A based on the occupancy value of egress buffer 66A and the drain rate.

In some examples, to determine the information indicative of the rate at which data units are to be transmitted to circuit block 54A based on the occupancy of egress buffer 66A and the drain rate, circuit block 54A is configured to determine an occupancy range among a plurality of discrete occupancy ranges that includes the determined occupancy value. For example, circuit block 54A determines whether the occupancy value indicative of the occupancy of egress buffer 66A is less than a first threshold, between a first threshold and a second threshold, between a second threshold and a third threshold, or greater than a third threshold. In this example, less than the first threshold, between first and second threshold, between second and third threshold, and greater than the third threshold are examples of discrete occupancy ranges, and circuit block 54A may determine which of these discrete ranges includes the determined occupancy value. Circuit block 54A may scale the drain rate based on the determined occupancy range to determine the rate at which data units are to be transmitted to circuit block 54A.

Egress buffer 66A is a reasonably deep buffer. For instance, egress buffer 66A has a capacity of 128 64B flits and is shared by the coherent and non-coherent virtual channels (VCs). For the purpose of congestion control, each virtual network can be thought of as an independent 2D mesh.

The following is pseudo-code showing how circuit block 54A may determine the rate at which data units are to be transmitted to circuit block 54A. In the pseudo-code, circuit block 54A may maintain four threshold for the occupancy of egress buffer 66A: first threshold, second threshold, third threshold, and fourth threshold. The thresholds are maintained per virtual channel. Circuit block 54A maintains two 4-bit pop counts for VC0 and VC1 (PCNT0, PCNT1). The pop count is incremented when a flit is read from egress buffer 66A. The pop counts are reset to 0 every 8 cycles. Hence, the pop counts have a range of 0 to 8. Circuit block 54A may determine the scaled pop counts (SPCNT[0], SPCNT[1]) from the pop counts and per-VC buffer occupancy as follows. The scaled pop counts are indicative of the rate at which data units are to be transmitted to circuit block 54A.

```
foreach i (0 .. 1) { //VC-0 and VC-1
  If (occupancy[i] < first threshold [i]) { // At startup, do not rate limit
    SPCNT[i] = 8; //data units are to be transmitted at maximum rate
  }
  Else if(occupancy[i] < second threshold[i]) {
    SPCNT[i] = PCNT[i]; //data units are to be transmitted at drain rate
  }
  Else if(occupancy[i] < third threshold[i]) {
    SPCNT[i] = PCNT[i]*0.5; //data units are to be transmitted at (drain rate)/2
  }
  Else if(occupancy[i] < fourth threshold[i]) {
    SPCNT[i] = PCNT[i]*0.25; //data units are to be transmitted at (drain rate)/4
  }
  Else {
    SPCNT[i] = 0; //data units are not be transmitted
  }
}
```

Circuit block 54A (e.g., via broadcast router 64A) serializes the scaled pop counts on the broadcast network and takes 8 cycles to transmit 8 bits of SPCNT0 (4 bits) and SPCNT1 (4 bits). Each of the other circuit blocks 54 keep track of the per-destination-per-VC pop counts. This counter is reloaded every 8 cycles when a SPCNT update is received. The SPCNT of the head flit of a VC may be non-zero for it to be eligible for transmission. Upon transmission of a flit, the corresponding SPCNT is decremented by 1.

The above is examples of rate limiting schemes to minimize congestion on communication mesh 56. The examples of the rate limiting schemes may ensure fairness to each of the source blocks that are transmitting to a destination block. For example, since source blocks that are closer to the destination block can react faster to when there is congestion on a destination block, and therefore, different source blocks may output at different rates where further away source blocks are penalized with lower rates. With the example techniques described in this disclosure, the source blocks each receive the same information indicative a rate at which to transmit data units. For example, the destination block determines the rate at which data units are to be transmitted to the destination block over a time window and the same information is broadcasted to all source blocks. Accordingly, the destination bandwidth is fairly divided across the source blocks (e.g., the bandwidth allocated to each of the source blocks is the same).

In this manner, circuit block 54A may be configured to determine a rate at which data units are to be transmitted to circuit block 54A. The other circuit blocks 54 may perform similar operations to determine a rate at which data units are to be transmitted to the other circuit blocks 54. Circuit block 54A broadcasts, via broadcast router 64A, the information indicative of the rate at which data units are to be transmitted to circuit block 54A to the other broadcast routers 64 that are directly coupled to broadcast router 64A (e.g., broadcast router 64B and broadcast router 64D). In the broadcast techniques described in this disclosure, broadcast routers 64B and broadcast routers 64D may determine whether to further broadcast the output from broadcast router 64A or from one of the other broadcast routers directly coupled to broadcast routers 64B and 64D (e.g., broadcast routers 64C and 64E for broadcast router 64B and broadcast routers 64E and 64G for broadcast router 64D).

For instance, similar to circuit block 54A, circuit block 54E may have determined a rate at which data units are to be transmitted to circuit block 54E and transmitted that information, via broadcast router 64E, to broadcast router 64B. Also, circuit block 54C may have determined a rate at which data units are to be transmitted to circuit block 54C and transmitted that information, via broadcast router 64C, to broadcast router 64B. Therefore, broadcast router 64B received information from three different broadcast routers 64A, 64E, and 64C. In some examples, broadcast router 64B may further broadcast information from one of the three broadcast routers 64A, 64E, and 64C from which broadcast router 64B received information. The following describes example techniques for forwarding the information received from one of broadcast routers 64 to other broadcast routers 64 where one of broadcast routers 64 receives information from multiple different broadcast routers 64.

It should be understood that not all circuit blocks 54 may determine a rate at which to transmit data. For instance, if one of circuit blocks 54 is a source block, then it is possible that the source block may not determine information indicative of a rate at which data is to be transmitted to the source block. However, a source block (e.g., that is transmitting to a destination block) may be a destination block to another source block, and therefore, the source block may determine a rate at which information is to be transmitted to the source block for the benefit of the block for which the source block is a destination block.

The algorithm used to broadcast the information indicative of rate at which data units are to be transmitted may need to handle a high event-rate of congestion messages (e.g., information indicative of rate at which data units are to be transmitted are received from different circuit blocks 54) and there should be low latency to keep the congestion reaction time and data skid to a minimum (e.g., the information indicative of the rate at which data units are to be transmitted should be received by the source blocks with low latency).

As described above, in some examples, congestion mesh 58 is a 2D mesh, and the number of lines in congestion mesh 58 is equal to the number of circuit blocks 54. Congestion mesh 58 may be considered as a one-bit 2D mesh that connects circuit blocks 54 together. Therefore, congestion mesh 58 may be a congestion broadcast network that is an N bit 2D mesh, where each bit is owned by one of circuit blocks 54 and N is the number of circuit blocks 54.

In some examples, each one of circuit blocks 54 may be represented by coordinates (x, y) and each one of circuit blocks 54 owns a one-bit 2D mesh based on congestion network. Circuit blocks 54 that generation information indicative of a rate at which data units are to be transmitted broadcast that information on four ports of its broadcast buffers 64 to all other directly coupled broadcast buffers 64.

On congestion mesh 58, for a block having coordinates (x, y), an intermediate block (e.g., between the source block and destination block) receives information on all ports, but only further broadcasts information from one of the ports (e.g., listening port). The following is one example way in which broadcast routers 64 may determine which one is the listening port. Assume that the intermediate block that includes one of broadcast routers 64 is located at (xi, yi).

```
if(xi != x){
    Listening_port = (xi > x) ? W_in : E_in
}
Else {
    Listening_port = (yi > y) ? S_in : N_in
}
```

In the above pseudo-code, $W_{in}$ refers to the information received from a broadcast router that is "West" of the broadcast router of the intermediate block. $E_{in}$ refers to the information received from a broadcast router that is "East" of the broadcast router of the intermediate block. $S_{in}$ refers to the information received from a broadcast router that is "South" of the broadcast router of the intermediate block. $N_{in}$ refers to the information received from a broadcast router that is "North" of the broadcast router of the intermediate block.

As an example, the following is an illustration of information broadcasted from broadcast router 64A. In this example, the coordinate for broadcast router 64 is in parentheses. For example, the coordinate for broadcast router 64A is (0, 2). In this example, the drain rate at the egress port of broadcast router at 64A needs to be broadcast to all other routers in the mesh. First, broadcast router 64A (0,2) broadcasts the information on the East and South ports to broadcast routers 64B (1,2) and 64D (0,1), respectively.

At broadcast router 64B (1,2), the listening port would be $W_{in}$ using the equation (since xi>x) and it uses the information received on the listening port. Congestion Route: 64A→64B. The value received on the listening port is also broadcast along E port (e.g., rightward in FIG. 2), S port (e.g., downward in FIG. 2), and W port (e.g., leftward in FIG. 2) to broadcast routers 64C (2,2), 64E (1,1) and 64A (0,2), respectively.

At broadcast router 64D (0,1), the listening port would be $N_{in}$ using the equation and it uses the information received on the listening port. Congestion route: 64A→64D. The value received on the listening port is also broadcast along E and S ports to broadcast routers 64E (1,1) and 64G (0,0), respectively.

At broadcast router 64E (1,1), the listening port would be Ein using the equation. Hence it uses the congestion information received from broadcast router 64D and ignores the information received on the other ports. Congestion route: 64A→64D→64E, i.e. Y-X routing. Broadcast router 64E also broadcasts the information it received on its listening port to its E, W, N, S ports to broadcast routers 64F (2,1), 64D (0,1), 64B (1,2), 64H (1,0).

At broadcast router 64C (2,2), the listening port would be $W_{in}$ using the equation and it uses the information received on the listening port. Hence it uses the information received from 64B. Congestion route: 64A→64B→64C. It also broadcasts the information received on the listening port to its W and S ports.

At broadcast router 64F (2,1), the listening port would be $W_{in}$ using the equation and it uses the information received on the listening port. Hence, it uses the information received from 64E. Congestion route: 64A→64D→64E→64F. It also broadcasts the information received on the listening port to its W, N, and S ports.

At broadcast router 64G (0,0), the listening port would be $N_{in}$ using the equation and it uses the information received on the listening port. Hence, it uses the information received from 64D. Congestion route: 64A→64D→64G. It also broadcasts the information received on the listening port to its E and N ports.

At broadcast router 64H (1,0), the listening port would be $W_{in}$ using the equation and it uses the information received on the listening port. Hence, it uses the information received from 64G. Congestion route: 64A→64D→64G→64H. It also broadcasts the information received on the listening port to its E, N and W ports.

At broadcast router 64I (2,0), the listening port would be $W_{in}$ using the equation and it uses the information received on the listening port. Hence, it uses the information received from 64H. Congestion route: 64A=>64D→64G→64H→64I. It also broadcasts the information received on the listening port to its N and W ports.

The other broadcast routers 64 may operate in a similar manner. For instance, there may be intermediate routers 64 that route information so that all other circuit blocks 54 receive information indicative of the data rate at which data should be transmitted to circuit blocks 54. In this way, each intermediate broadcast router determine a position of the broadcast routers from which information was received, and based on the determined position, determine which broadcast router's information to further broadcast.

Accordingly, because broadcast routers 64 form part of congestion mesh 58 for routing information, congestion mesh 58 may be considered as routing information in a manner that accounts for relative positions of circuit blocks 54. For example, the information indicative of data rates follows a particular path through congestion mesh 58, where broadcast routers 64 route the data information through congestion mesh 58 in a manner that accounts for the relative positions of circuit blocks 54 (e.g., broadcast routers 64 within circuit blocks 54) in congestion mesh 58.

In the above pseudo-code, the information indicative of a rate at which data units are to be transmitted is broadcasted using Y X routing. For instance, the information indicative of a rate at which data units are to be transmitted is routed on the Y dimension first, and then the X dimension. Routing along the Y dimension first, and then the X dimension is just one example, and routing along the X dimension first, and then the Y dimension is possible. Also, there may be other example ways in which to broadcast, and the techniques are not limited to the above example.

The above broadcast algorithm may address issues where same information is received over multiple paths. For instance, if each one of broadcast routers 64 broadcasted all of the received information, then multiple broadcast routers 64 would all receive the same information. With the above example techniques, information indicative of a rate at which data units are to be transmitted is carried over a minimal Y-X path, which implies low latency. In some examples, a minimal X-Y path is possible such as where the if/else operations in the pseudo code above are reversed. For instance, congestion mesh 58, via broadcast routers 64, routes data based on positions of circuit blocks 54 so that the data is carried over a minimal Y-X path (or X-Y path in some other examples).

Even though broadcast routers 64 further broadcast information received on only one port, in some examples, broadcast routers 64 output to respective processing circuitry 60 information indicative of the rate at which data units are to be transmitted to circuit blocks 54 from which broadcast routers 64 received information. In such examples, processing circuitry 60 store the information in local memory (e.g., ingress rate limiter block) so that if processing circuitry 60 needs to transmit information to one of the circuit blocks 54 that generated the information, within a certain time window, processing circuitry 60 can output at the rate indicated in the information. For instance, a source block receives the information indicative of a rate at which data units are to be transmitted to a destination block (e.g., circuit block 54A). The source block determines the rate at which to transmit data units for circuit block 54A based on the received information and transmit data units that are for circuit block 54A at the determined rate.

The following is an example of broadcasting the information indicative of rate at which data units are to be transmitted to circuit block 54A. A first broadcast router (e.g., broadcast router 64A) is configured to broadcast the determined information indicative of the rate at which data units are to be transmitted to circuit block 54A. A second broadcast router (e.g., broadcast router 64B) is configured to receive, via the congestion lines of congestion 58, broadcasted information from two or more of the broadcast routers including from the first broadcast router. For example, broadcast router 64B receives from broadcast router 64A, 64C, and 64E. The broadcast information from the first broadcast router (e.g., broadcast router 64A) includes the information indicative of the rate at which data units are to be transmitted to circuit block 54A. The second broadcast router (e.g., broadcast router 64B) may determine which of the broadcasted information to further broadcast on the congestion lines of congestion mesh 58 based on positions of the two or more of the broadcast routers (e.g., based on the position of broadcast routers 64A, 64C, and 64E relative to broadcast router 64B).

A third broadcast router (e.g., broadcast router 64C) of a source block (e.g., assume circuit block 54C is a source block) of the circuit blocks 54 is configured to, based on the second broadcast router (e.g., broadcast router 64B) determining to broadcast the broadcasted information from the first broadcast router (e.g., broadcast router 64A), transmit the information indicative of the rate at which data units are to be transmitted to circuit block 54A to a processing circuit 60C of the source block (e.g., circuit block 54C). In this example, the source block (e.g., circuit block 54C) is configured to determine the rate at which to transmit data units for circuit block 54A based on the received information from broadcast router 64C and transmit data units that are for circuit block 54A at the determined rate.

In the above example, circuit block 54C transmitted data units to circuit block 54A at the rate determined by circuit block 54A. In some examples, circuit block 54C is also transmitting to other destination blocks (e.g., circuit block 54G). It may be possible that circuit block 54A is transmitting data units to circuit block 54A at a first rate and transmitting data units to circuit block 54G at a second rate that is different than the first rate.

In some examples, the information indicative of the rate at which data units are to be transmitted may need to serialized over congestion mesh 58 (e.g., in the one-bit 2D mesh). Accordingly, broadcast routers 64 may need to synchronize their state machines to capture and deserialize the message from congestion mesh 58. One way to perform such synchronization is through a software-triggered synchronization pulse generated from each one of broadcast routers 64 and broadcasted on congestion mesh 58 before starting the information indicative of the rate at which data units are to be transmitted. One example of the synchronization pulse is a change from a digital zero to a digital one. Once broadcast routers 64 have received the synchronization pulse (e.g., subsequent to receiving the synchronization pulse) and synchronized their state machines, broadcast routers 64 may transmit the information indicative of a rate at which data units are to be transmitted on to congestion mesh 58.

Figure 3:
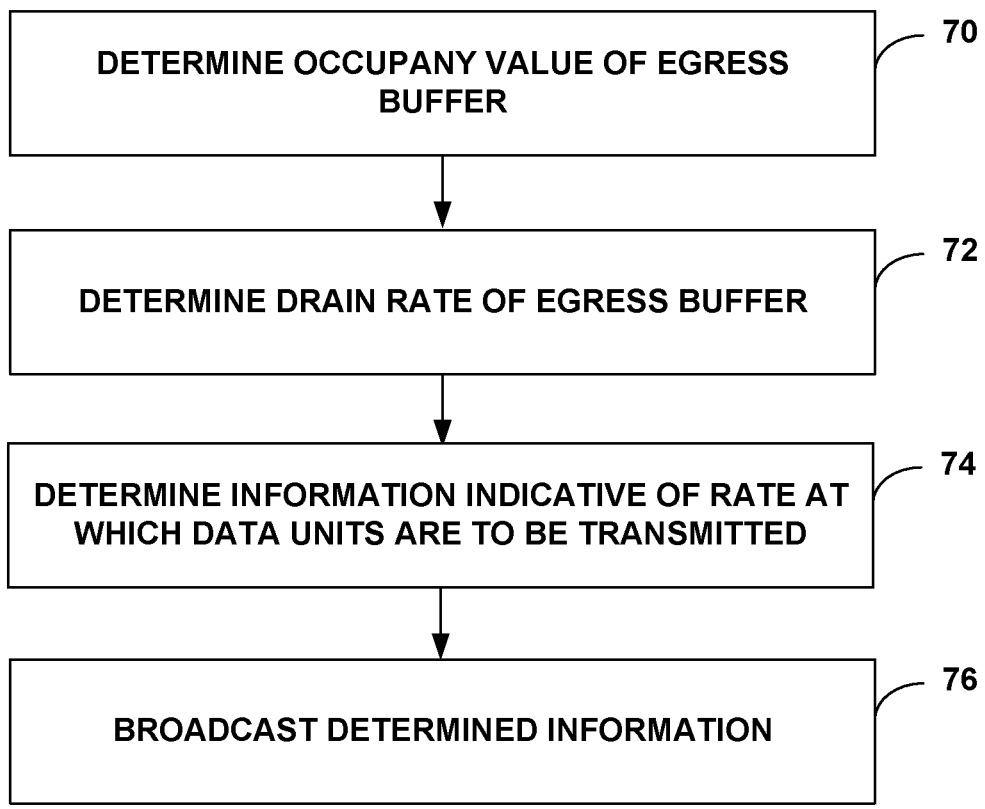
FIG. 3 is a flowchart illustrating an example method of determining a rate at which data units are to be transmitted to a destination block, in accordance with the techniques of this disclosure.

FIG. 3 is a flowchart illustrating an example method of determining a rate at which data units are to be transmitted to a destination block, in accordance with the techniques of this disclosure. For ease of description, the example is described with respect to circuit block 54A being a destination block.

Circuit block 54A determines an occupancy value of egress buffer 64A (70). The occupancy value is indicative of how full egress buffer 64A is. Circuit block 54A determines a drain rate of egress buffer 64A (72). The drain rate is a rate at which data units are popped out of egress buffer 64A within a time window.

Circuit block 54A determines information indicative of a rate at which data units are to be transmitted to circuit block 54A (74). For example, circuit block 54A may determine an occupancy range among a plurality of discrete occupancy ranges that includes the determined occupancy value and scale the drain rate based on the determined occupancy range to determine the rate at which data units are to be transmitted to circuit block 54A.

Circuit block 54A, via broadcast router 64A on congestion mesh 58, may broadcast the determined information indicative of a rate at which data units are to be transmitted to circuit block 54A (76). One or more source blocks transmitting to circuit block 54A may be configured to receive the information indicative of a rate at which data units are to be transmitted to circuit block 54A, determine the rate at which to transmit data units for circuit block 54A based on the received information, and transmit data units that are for circuit block 54A at the determined rate. The one or more source blocks may be configured to transmit data units to destination blocks other than circuit block 54A at a rate different than the rate at which the one or more source blocks are configured to transmit data units to circuit block 54A.

Figure 4:
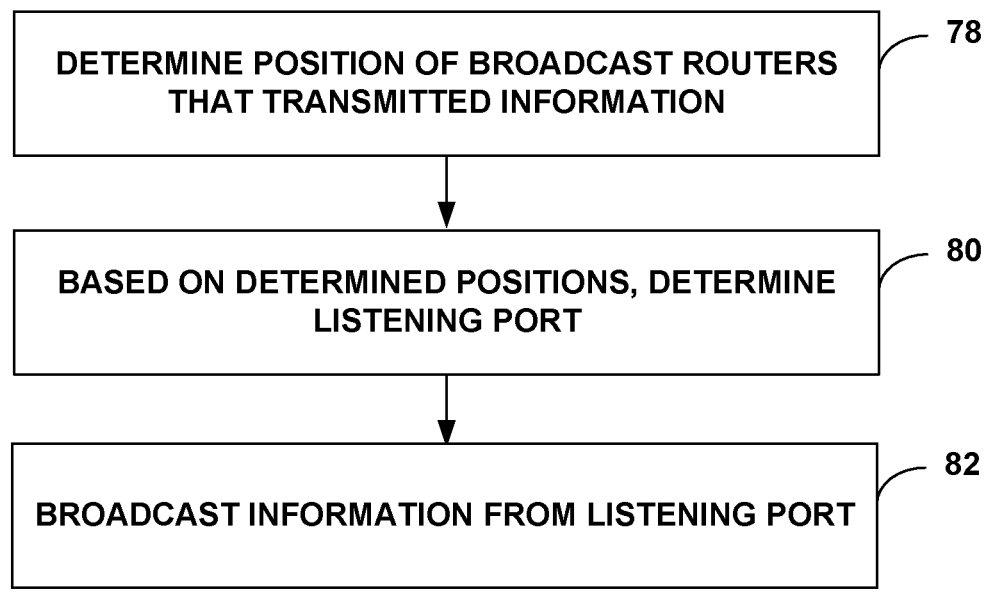
FIG. 4 is a flowchart illustrating an example method of broadcasting information indicative of a rate at which data units are to be transmitted to one or more source blocks.

FIG. 4 is a flowchart illustrating an example method of broadcasting information indicative of a rate at which data units are to be transmitted to one or more source blocks. As one example, broadcast router 64E may determine positions of broadcast routers 64 that transmitted information to broadcast router 64E (e.g., positions of broadcast routers 64B, 64D, 64F, and 64G) (78). One example way in which to determine the positions of broadcast routers 64 is based on their respective positions with the 2D communication mesh 56. For example, the top-left circuit block 54A may have a coordinate of (0, 0) and therefore broadcast router 64A may have a coordinate of (0, 0), and bottom-right circuit block 54I may have a coordinate of (2, 2) and therefore broadcast router 64I may have a coordinate of (2, 2).

Based on the determined positions, broadcast router 64E may determine a listening port (80). For example, broadcast router 64E may have five ports, where one port is for communicating with processing circuitry 60E, and other four ports are for receiving and transmitting on congestion lines of congestion mesh 58. The four ports broadcast router 64E may each receive information from broadcast router 64B (from the "North"), broadcast router 64D (from the "West"), broadcast router 64F (from the "East"), and broadcast router 64G (from the "South"). Broadcast router 64E may determine which of the four ports to listen to based on positions of broadcast routers 64B, 64D, 64F, and 64G (e.g., in accordance with the pseudo-code for minimal X-Y or Y-X path, but the techniques are not so limited).

Broadcast router 64E may then broadcast the information from the determined listening port on all four ports and possibly all five ports (82). This process may repeat with the next set of broadcast routers that receive from broadcast router 64E (e.g., broadcast routers 64B, 64D, 64F, and 64G). Also, in some examples, broadcast router 64E may output to processing circuitry 60E information of the rate at which to transmit data units to circuit blocks 54B, 54D, 54F, and 54G based on the information received from broadcast routers 64B, 64D, 64F, and 64G.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in the referenced figures in order to avoid obscuring such concepts.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A data processing unit (DPU) integrated circuit comprising:
  a plurality of circuit blocks comprising at least one destination block, wherein the at least one destination block includes a first broadcast router, and wherein the at least one destination block is configured to:
    determine information indicative of a rate at which data units are to be transmitted to the at least one destination block; and broadcast, via the first broadcast router, to the plurality of circuit blocks the determined information indicative of the rate at which data units are to be transmitted to the at least one destination block;

a communication mesh comprising a plurality of data lines to carry the data units to the at least one destination block;

a congestion mesh comprising a plurality of congestion lines to carry the determined information indicative of the rate at which data units are to be transmitted to the at least one destination block; and a plurality of broadcast routers, including the first broadcast router of the at least one destination block and a second broadcast router, coupled to the congestion mesh, wherein the second broadcast router is configured to receive broadcasted information from two or more of the broadcast routers, including the first broadcast router, and further broadcast the determined information from the first broadcast router, and not broadcast broadcasted information from the other broadcast routers, based on a position of the first broadcast router relative to the second broadcast router to route the determined information via the broadcast routers in a manner that accounts for relative positions of the circuit blocks in the congestion mesh.

2. The DPU of claim 1, further comprising an egress buffer associated with the at least one destination block, and wherein to determine information indicative of the rate at which data units are to be transmitted to the at least one destination block, the at least one destination block is configured to:

determine an occupancy value of the egress buffer;

determine a drain rate of the egress buffer, wherein the drain rate is indicative of a rate at which data units are outputted from the egress buffer for processing by the at least one destination block; and determine the information indicative of the rate at which data units are to be transmitted to the at least one destination block based on the occupancy value of the egress buffer and the drain rate.

3. The DPU of claim 2, wherein to determine the information indicative of the rate at which data units are to be transmitted to the at least one destination block based on the occupancy of the egress buffer and the drain rate, the at least one destination block is configured to:

determine an occupancy range among a plurality of discrete occupancy ranges that includes the determined occupancy value; and scale the drain rate based on the determined occupancy range to determine the rate at which data units are to be transmitted to the at least one destination block.

4. The DPU of claim 1, wherein each of the plurality of circuit blocks comprise a respective one of the plurality of broadcast routers that are coupled to the congestion mesh, wherein to further broadcast the determined information from the first broadcast router, and not broadcast broadcasted information from the other broadcast routers, based on the position of the first broadcast router relative to the second broadcast router, the second broadcast router is configured to:

determine which of the broadcasted information to further broadcast on the congestion lines of the congestion mesh based on positions of the two or more of the broadcast routers, wherein a third broadcast router of a source block of the circuit blocks is configured to, based on the second broadcast router determining to broadcast the broadcasted information from the first broadcast router, transmit the information indicative of the rate at which data units are to be transmitted to the at least one destination block to a processing circuit of the source block, and wherein the source block is configured to:

determine the rate at which to transmit data units for the at least one destination block based on the received information from the third broadcast router; and transmit data units that are for the at least one destination block at the determined rate.

5. The DPU of claim 1, wherein the plurality of circuit blocks comprise one or more source blocks configured to transmit the data units to the at least one destination block, wherein the one or more source blocks are configured to:

receive the information indicative of a rate at which data units are to be transmitted to the at least one destination block;

determine the rate at which to transmit data units for the at least one destination block based on the received information; and transmit data units that are for the at least one destination block at the determined rate.

6. The DPU of claim 5, wherein the one or more source blocks are configured to transmit data units to destination blocks other than the at least one destination block at a rate different than the rate at which the one or more source blocks are configured to transmit data units to the at least one destination block.

7. The DPU of claim 1, wherein a number of congestion lines is equal to a number of the plurality of circuit blocks.

8. The DPU of claim 1, wherein the at least one destination block is configured to transmit a synchronization pulse, and wherein to broadcast to the plurality of circuit blocks the determined information indicative of the rate at which data units are to be transmitted to the at least one destination block, the at least one destination block is configured to broadcast subsequent to the transmission of the synchronization pulse.

9. The DPU of claim 1, wherein to broadcast, via the first broadcast router, to the plurality of circuit blocks the determined information indicative of the rate at which data units are to be transmitted to the at least one destination block, the first broadcast router of the destination block is configured to output the information indicative of the rate at which data units are to be transmitted to the at least one destination block to all other broadcast routers to which the first broadcast router is directly coupled.

10. A method for communicating in a data processing unit (DPU) integrated circuit, the method comprising:

determining, with at least one destination block of the DPU, information indicative of a rate at which data units are to be transmitted to the at least one destination block of the DPU, wherein the DPU comprises a plurality of circuit blocks, and at least one of the plurality of circuit blocks is the at least one destination block;

broadcasting, with a first broadcast router of the at least one destination block, to the plurality of circuit blocks the determined information indicative of the rate at which data units are to be transmitted to the at least one destination block;

carrying, via a plurality of data lines of a communication mesh, the data unit on to the at least one destination block;

carrying, via a plurality of congestion lines of a congestion mesh, the determined information indicative of the rate at which data units are to be transmitted to the at least one destination block, wherein the first broadcast router is one of a plurality of broadcast routers, and wherein the plurality of broadcast routers are coupled to the congestion mesh;

receiving, with a second broadcast router of the plurality of broadcast routers coupled to the congestion mesh, broadcasted information from two or more of the broadcast routers, including the first broadcast router; and further broadcasting, with the second broadcast router, the determined information from the first broadcast router, and not broadcast broadcasted information from the other broadcast routers, based on a position of the first broadcast router relative to the second broadcast router to route the determined information via the broadcast routers in a manner that accounts for relative positions of the circuit blocks in the congestion mesh.

11. The method of claim 10, wherein determining, with the at least one destination block, information indicative of the rate at which data units are to be transmitted to the at least one destination block comprises:

determining determine an occupancy value of an egress buffer associated with the at least one destination block;

determining a drain rate of the egress buffer, wherein the drain rate is indicative of a rate at which data units are outputted from the egress buffer for processing by the at least one destination block; and determining the information indicative of the rate at which data units are to be transmitted to the at least one destination block based on the occupancy value of the egress buffer and the drain rate.

12. The method of claim 11, wherein determining the information indicative of the rate at which data units are to be transmitted to the at least one destination block based on the occupancy of the egress buffer and the drain rate comprises:

determining an occupancy range among a plurality of discrete occupancy ranges that includes the determined occupancy value; and scaling the drain rate based on the determined occupancy range to determine the rate at which data units are to be transmitted to the at least one destination block.

13. The method of claim 10, wherein each of the plurality of circuit blocks comprise a respective one of the plurality of broadcast routers that are coupled to the congestion mesh, wherein further broadcasting, with the second broadcast router, the determined information from the first broadcast router, and not broadcast broadcasted information from the other broadcast routers, based on the position of the first broadcast router relative to the second broadcast router comprises determining, with the second broadcast router, which of the broadcasted information to further broadcast on the congestion lines of the congestion mesh based on positions of the two or more of the broadcast routers, the method further comprising:

based on the second broadcast router determining to broadcast the broadcasted information from the first broadcast router, transmitting, with a third broadcast router, the information indicative of the rate at which data units are to be transmitted to the at least one destination block to a processing circuit of the source block;

determining, with the source block, the rate at which to transmit data units for the at least one destination block based on the received information from the third broadcast router; and transmitting, with the source blocks, data units that are for the at least one destination block at the determined rate.

14. The method of claim 10, wherein the plurality of circuit blocks comprise one or more source blocks configured to transmit the data units to the at least one destination block, the method further comprising:

receiving, with the one or more source blocks, the information indicative of a rate at which data units are to be transmitted to the at least one destination block;

determining, with the one or more source blocks, the rate at which to transmit data units for the at least one destination block based on the received information; and transmitting, with the one or more source blocks, data units that are for the at least one destination block at the determined rate.

15. The method of claim 14, further comprising:

transmitting, with the one or more source blocks, data units to destination blocks other than the at least one destination block at a rate different than the rate at which the one or more source blocks are configured to transmit data units to the at least one destination block.

16. The method of claim 10, wherein a number of congestion lines is equal to a number of the plurality of circuit blocks.

17. The method of claim 10, further comprising transmitting, with the at least one destination block, a synchronization pulse, wherein broadcasting to the plurality of circuit blocks the determined information indicative of the rate at which data units are to be transmitted to the at least one destination block comprising broadcasting subsequent to the transmission of the synchronization pulse.

18. The method of claim 10, wherein broadcasting, with the first broadcast router of the at least one destination block, to the plurality of circuit blocks the determined information indicative of the rate at which data units are to be transmitted to the at least one destination block comprises:

outputting, with the first broadcast router of the destination block, the information indicative of the rate at which data units are to be transmitted to the at least one destination block to all other broadcast routers to which the first broadcast router is directly coupled.

19. A data processing unit (DPU) integrated circuit comprising:

a plurality of broadcast routers;

a plurality of circuit blocks comprising at least one destination block and one or more source blocks configured to transmit the data units to the at least one destination block, wherein the at least one destination block is configured to:

determine information indicative of a rate at which data units are to be transmitted to the at least one destination block; and broadcast, via a broadcast router of the plurality of broadcast routers, to the plurality of circuit blocks the determined information indicative of the rate at which data units are to be transmitted to the at least one destination block;

a communication mesh comprising a plurality of data lines to carry the data units to the at least one destination block; and a congestion mesh coupled to the plurality of broadcast routers, the congestion mesh comprising a plurality of congestion lines to carry the determined information indicative of the rate at which data units are to be transmitted to the at least one destination block, wherein the congestion mesh is configured to route broadcasted information, including the determined information, in a manner that accounts for relative positions of the circuit blocks in the congestion mesh, wherein to route the broadcasted information, including the determined information, each broadcast router of the plurality of broadcast router is configured to receive the broadcasted information from two or more of the broadcast routers, and further broadcast the broadcasted information on the congestion mesh from one of the two or more of the broadcast routers based on respective positions of the two or more of the broadcast routers, and wherein the one or more source blocks are configured to:
  receive the information indicative of a rate at which data units are to be transmitted to the at least one destination block;
  determine the rate at which to transmit data units for the at least one destination block based on the received information; and
  transmit data units that are for the at least one destination block at the determined rate.

20. A data processing unit (DPU) integrated circuit comprising:
  a plurality of broadcast routers;
  a plurality of circuit blocks comprising at least one destination block, wherein the at least one destination block is configured to:
    determine information indicative of a rate at which data units are to be transmitted to the at least one destination block; and
    broadcast, via a broadcast router of the plurality of broadcast routers, to the plurality of circuit blocks the determined information indicative of the rate at which data units are to be transmitted to the at least one destination block, wherein to broadcast to the plurality of circuit blocks the determined information indicative of the rate at which data units are to be transmitted to the at least one destination block, the broadcast router of the destination block is configured to output the information indicative of the rate at which data units are to be transmitted to the at least one destination block to all other broadcast routers to which the broadcast router is directly coupled;
  a communication mesh comprising a plurality of data lines to carry the data units to the at least one destination block; and
  a congestion mesh coupled to the plurality of broadcast routers, the congestion mesh comprising a plurality of congestion lines to carry the determined information indicative of the rate at which data units are to be transmitted to the at least one destination block, wherein the congestion mesh is configured to route broadcasted information, including the determined information, in a manner that accounts for relative positions of the circuit blocks in the congestion mesh, and wherein to route the broadcasted information, including the determined information, each broadcast router of the plurality of broadcast router is configured to receive the broadcasted information from two or more of the broadcast routers, and further broadcast the broadcasted information on the congestion mesh from one of the two or more of the broadcast routers based on respective positions of the two or more of the broadcast routers.

* * * * *